United States Patent
Koyanaka

(10) Patent No.: US 9,922,742 B2
(45) Date of Patent: Mar. 20, 2018

(54) TRITIUM ADSORBENT, METHOD FOR SEPARATING TRITIUM IN WATER, AND METHOD FOR REGENERATING TRITIUM ADSORBENT

(71) Applicant: Hideki Koyanaka, Oita (JP)

(72) Inventor: Hideki Koyanaka, Oita (JP)

(73) Assignee: Hideki Koyanaka, Oita (JP)

( * ) Notice: Subject to any disclaimer, the term of this patent is extended or adjusted under 35 U.S.C. 154(b) by 139 days.

(21) Appl. No.: 15/021,448

(22) PCT Filed: Sep. 12, 2014

(86) PCT No.: PCT/JP2014/074334
§ 371 (c)(1),
(2) Date: Mar. 11, 2016

(87) PCT Pub. No.: WO2015/037734
PCT Pub. Date: Mar. 19, 2015

(65) Prior Publication Data
US 2016/0233001 A1    Aug. 11, 2016

(30) Foreign Application Priority Data

Sep. 13, 2013 (JP) .................. 2013-191174
Oct. 21, 2013 (JP) .................. 2013-218747
Mar. 28, 2014 (JP) .................. 2014-069967

(51) Int. Cl.
*C02F 1/42* (2006.01)
*G21F 9/04* (2006.01)
(Continued)

(52) U.S. Cl.
CPC ............ *G21F 9/12* (2013.01); *B01D 15/426* (2013.01); *B01D 59/26* (2013.01); *B01J 20/06* (2013.01);
(Continued)

(58) Field of Classification Search
CPC ......... B01D 59/26; B01D 15/426; G21F 9/12; G21F 9/04; G21F 9/06; B01J 20/06; C02F 1/281; C02F 2101/006
See application file for complete search history.

(56) References Cited

U.S. PATENT DOCUMENTS 3,986,835 A * 10/1976 Takagi .................. B08B 15/023
                                                    422/159
4,964,900 A * 10/1990 Thompson ............. A62B 23/02
                                                    128/205.12
(Continued)

FOREIGN PATENT DOCUMENTS

EP        3045223 A1 *  7/2016 .............. B01J 20/06
JP        0217015542   *  1/2017
(Continued)

OTHER PUBLICATIONS

K. Sato et al, The surface Structure of the Proton-Exchanged Lithium Manganese Oxide Spiinels and their Lithium-ion Sieve Properties; Journal of Solid State Chemistry 131, 84-93 (1997).*

(Continued)

*Primary Examiner* — Ana Fortuna
(74) *Attorney, Agent, or Firm* — Wenderoth, Lind & Ponack, L.L.P.

(57) ABSTRACT

A method of using hydrogen- or lithium-containing manganese oxide having a spinel crystal structure as a tritium adsorbent to trap tritium from tritium-containing water makes it possible to inexpensively separate tritium from water.

6 Claims, 12 Drawing Sheets

(51) Int. Cl.
    *B01J 49/00*     (2017.01)
    *G21F 9/12*     (2006.01)
    *B01J 20/06*     (2006.01)
    *B01D 59/26*     (2006.01)
    *G21F 9/06*     (2006.01)
    *B01J 20/28*     (2006.01)
    *B01J 20/34*     (2006.01)
    *C01B 4/00*     (2006.01)
    *B01D 15/42*     (2006.01)
    *C02F 1/28*     (2006.01)
    *C02F 101/00*     (2006.01)
    *C02F 103/06*     (2006.01)
    *C02F 103/34*     (2006.01)

(52) U.S. Cl.
    CPC ....... *B01J 20/28033* (2013.01); *B01J 20/345* (2013.01); *B01J 20/3433* (2013.01); *C01B 4/00* (2013.01); *C02F 1/281* (2013.01); *G21F 9/04* (2013.01); *G21F 9/06* (2013.01); *C02F 2101/006* (2013.01); *C02F 2103/06* (2013.01); *C02F 2103/34* (2013.01); *C02F 2303/16* (2013.01)

(56) References Cited

U.S. PATENT DOCUMENTS

| | | | | |
|---|---|---|---|---|
| 5,182,075 | A * | 1/1993 | Gotoh | G21B 1/13 376/136 |
| 2011/0224472 | A1 * | 9/2011 | Denton | G21F 9/02 588/11 |
| 2013/0178686 | A1 * | 7/2013 | Lefebvre | G21F 9/02 588/20 |
| 2014/0076734 | A1 * | 3/2014 | Calvo | C25C 1/02 205/342 |
| 2014/0210122 | A1 * | 7/2014 | Chung | B01J 20/06 264/42 |
| 2016/0133931 | A1 * | 5/2016 | Kim | H01M 4/505 252/182.1 |
| 2016/0233001 | A1 * | 8/2016 | Koyanaka | B01J 20/06 |

FOREIGN PATENT DOCUMENTS

JP      2017015543 A * 1/2017
WO    WO 2016/178437 A8 * 6/2016

OTHER PUBLICATIONS

James C. Hunter, Preparation of a new crystal form of manganese dioxide landa-MnO2; Journal of Solid State Chemistry 1981, pp. 142-147 (abstract Only).*

* cited by examiner (a)

(b)

(c)

(a)

(b)

TRITIUM ADSORBENT, METHOD FOR SEPARATING TRITIUM IN WATER, AND METHOD FOR REGENERATING TRITIUM ADSORBENT

TECHNICAL FIELD

The present invention relates to a tritium adsorbent, a method for separating tritium in water, and a method for regenerating a tritium adsorbent.

BACKGROUND ART

Tritium (T) is dissolved in normal water ($H_2O$) as a tritium ion ($^3T^+$) and water isotope isomers ($T_2O$, THO). The tritium ion is an isotope of a hydrogen ion ($^1H^+$) and a radioactive element which emits β-ray (electron beam) and has a half-life period of 12.3 years. In addition, the tritium ion ($^3T^+$) has chemical properties similar to those of a hydrogen ion ($^1H^+$) so as to have a property that the tritium ion ($^3T^+$) remains in the body by being exchanged with the hydrogen ion which constitutes the DNA in the body of a living being. For this reason, the tritium ion is harmful as it can be a causative agent of internal exposure.

The natural abundance of tritium is a significantly small amount (proportion of one per $1\times10^{18}$ of hydrogen atoms), but tritium is artificially produced in a fission-type nuclear power facility or a nuclear fusion reaction facility. For this reason, the limit of waste water concentration by the laws and regulations of Japan is defined as 60,000 Bq/L (60 Bq/mL) as the limit value of radioactive concentration derived from tritium per 1 liter of the sample water in the notification to define the dose limit or the like on the basis of the provisions of the regulations on the establishment of commercial power reactor, the operation, and the like.

Usually, the difference in the physical properties such as the boiling point and the mass between water ($H_2O$) and water isotope isomers ($T_2O$, THO) that is different from water in order to separate tritium in water. These methods of the prior art are described, for example, in Vasaru, G. Tritium Isotope Separation 1993, CRC Press, Chap. 4-5, Villani, S. Isotope Separation 1976, Am. Nuclear Soc., Chap. 9, Gould, RF Separation of Hydrogen Isotopes 1978, Am. Nuclear Soc., Chap. 9, and the like.

SUMMARY OF INVENTION

Technical Problem

However, the existing tritium separation technique to utilize the difference in physical properties is a technique that separates tritium in water at a significantly high concentration. For example, the existing tritium separation technique is a technique that separates tritium which is in water at a high concentration and is produced along with the operation of the Canada type heavy water reactor "CANDU reactor" or the domestic advanced thermal reactor "Fugen", and the tritium concentration is from 500,000 to 5,000,000 Bq/L to be higher by about one million times as compared to the tritium concentration in the radioactively contaminated water at the accident scene at the Fukushima Daiichi nuclear power plant, of which the management is currently a challenge. Moreover, the existing tritium separation technique has a slower treatment speed and is intended to treat a small amount of tritium-containing water (water contaminated with tritium).

At the accident scene of the Fukushima Daiichi nuclear power plant, a huge amount reaching 400,000 tons or more of radioactively contaminated water which contains tritium at a low concentration of from 500,000 to 5,000,000 Bq/L (0.14 to 1.4 ng/L) has been generated at the present time after a polynuclear species including cesium or strontium had been removed, and from the viewpoint of the treatment efficiency, it is significantly technically and economically difficult to remove tritium from the contaminated water using a method of the prior art that is intended to treat a small amount of water contaminated with tritium at a high concentration. In addition, the tritium concentration in the contaminated water is from 0.14 to 1.4 ng/L to be a low concentration as the mass concentration as described above, but it is a high radioactive concentration to reach from 10000 to 50000 times the tritium concentration (100 Bq/L) that is allowed in drinking water standards in Europe. In the future, it is estimated that at least 40 years is required until the recovery of debris in the melted core is completed, and it is expected that a new huge amount of contaminated water is continuously generated during that period. For this reason, it is difficult to obtain global understanding on the treatment to dilute the contaminated water with water to the regulation value for waste water concentration and to discharge it into the ocean.

It is the actual situation that the demand for the realization of the adsorbent that makes it possible to inexpensively separate tritium from water is growing in the treatment of cleaning water generated along with the demolition work in the decommissioning process in a number of nuclear power plants all over the world including the treatment of a great amount of contaminated water in the Fukushima Daiichi nuclear power plant.

The present invention has been made in view of the circumstances as described above, and an object thereof is to provide a tritium adsorbent that makes it possible to inexpensively separate tritium from water, a method for separating tritium in water, and a method for regenerating a tritium adsorbent.

Solution to Problem

In order to achieve the above object, the tritium adsorbent of the present invention is a tritium adsorbent which traps tritium from tritium-containing water and is constituted by hydrogen- or lithium-containing manganese oxide having a spinel crystal structure.

This tritium adsorbent may be constituted by an electrode having the hydrogen- or lithium-containing manganese oxide having a spinel crystal structure on the surface of an electro conductive metal.

In this tritium adsorbent, an electrode having the hydrogen- or lithium-containing manganese oxide having a spinel crystal structure on the surface of an electro conductive metal may be constituted as a tritium separation membrane.

In addition, the method for separating tritium of the present invention includes bringing acidic tritium-containing water into contact with the tritium adsorbent to adsorb tritium in the tritium-containing water to the tritium adsorbent and to separate the tritium from the tritium-containing water.

In this method for separating tritium in water, the tritium-containing water that has been brought into contact with the tritium adsorbent is circulated so as to be brought into contact with the tritium adsorbent again, and the circulation of the tritium-containing water may be carried out until the concentration of radioactivity derived from tritium contained in the tritium-containing water reaches a value that is equal to or less than the reference value.

In this method for separating tritium in water, the tritium adsorbent to which tritium is adsorbed may be subjected to an acid treatment to elute and recover the tritium from the tritium adsorbent.

In addition, the method for regenerating a tritium adsorbent of the present invention includes supplementing the tritium adsorbent to which tritium is adsorbed with a hydrogen ion or a lithium ion to regenerate the tritium adsorbent in a state capable of adsorbing tritium again.

As a method for supplementing the tritium adsorbent with a hydrogen ion or a lithium ion, the supplementation is carried out by subjecting a hydrogen-containing manganese oxide adsorbent to an acid treatment and by subjecting a lithium-containing manganese oxide adsorbent to a treatment by weakly alkaline lithium ion-containing water.

Advantageous Effects of Invention

According to the present invention, it is possible to inexpensively separate tritium from water.

DESCRIPTION OF EMBODIMENTS

Figure 1:
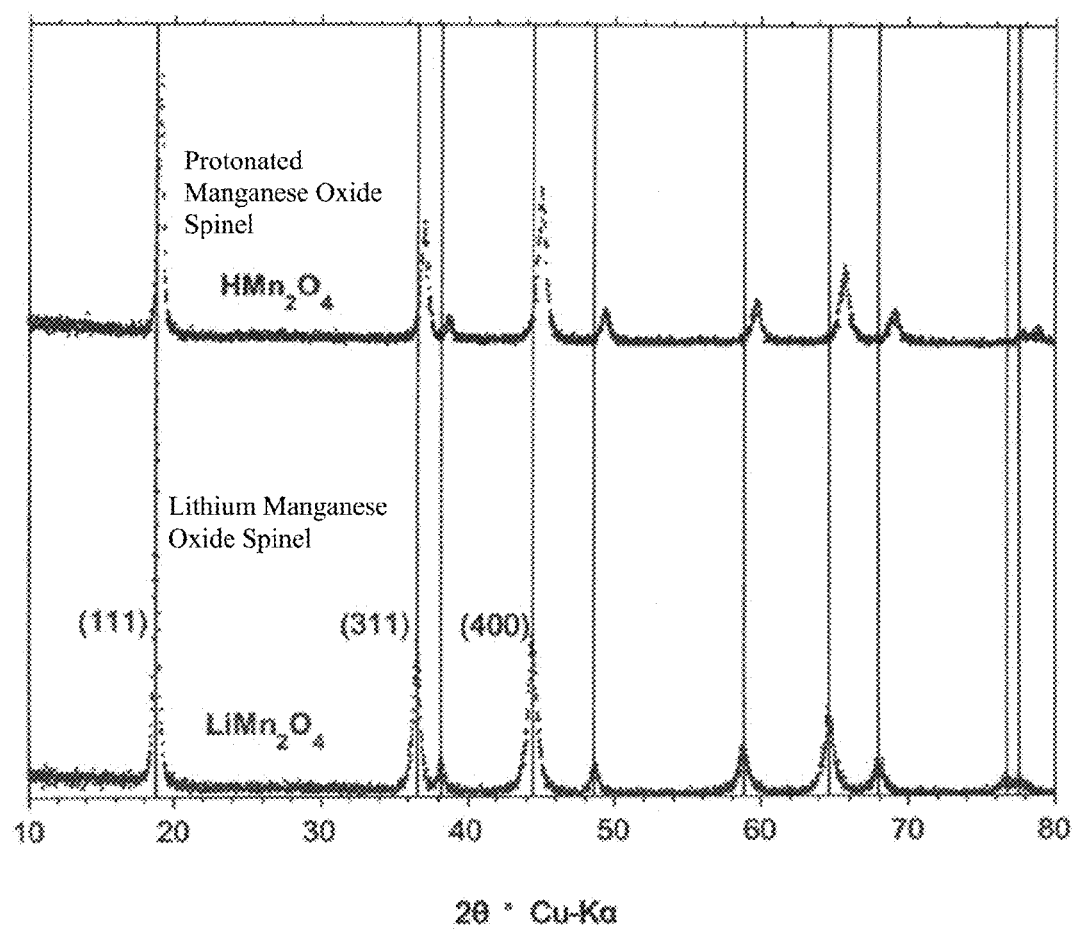
FIG. 1 illustrates an X-ray diffraction pattern of a tritium adsorbent.

The tritium adsorbent of the present invention is constituted by hydrogen-containing manganese oxide having a spinel crystal structure (theoretical composition ratio based on crystallography: $H_xMn_2O_4$; it is $0<x\leq1$) or lithium-containing manganese oxide having a spinel crystal structure (theoretical composition ratio based on crystallography: $Li_xMn_2O_4$; it is $0<x\leq1$).

Hydrogen- or lithium-containing manganese oxide having a spinel crystal structure was reported, for example, in J. C. Hunter, Preparation of a new crystal structure of manganese dioxide: Lambda-$MnO_2$, Journal of Solid State Chemistry 39 (1981) 142-147, or the conditions in order to optimize the hydrogenation was reported in H. Koyanaka, O. Matsubaya, Y. Koyanaka, and N. Hatta, Quantitative correlation between Li absorption and H content in Manganese Oxide Spinel $\lambda$-$MnO_2$, Journal of Electroanalytical Chemistry 559 (2003) 77-81, and the like. Hydrogen- or lithium-containing manganese oxide having a spinel crystal structure can be synthesized, for example, by the following method.

Lithium-containing manganese oxide having a spinel crystal structure can be obtained, for example, through the mixing, calcination, and purification steps using chemicals such as a carbonate salt of manganese such as manganese carbonate or a hydrate of manganese carbonate and a hydroxide of lithium as raw materials.

Hydrogen-containing manganese oxide having a spinel crystal structure can be obtained further conducting an acid treatment step in addition to the above steps.

In the mixing step, for example, the raw materials described above are mixed together at room temperature. At this time, mixing is conducted until the mixture is blackened. By this, a crystal nucleus of lithium-containing manganese oxide having a spinel crystal structure is produced. In the calcination step, the nucleus produced in the mixing step is grown. For example, the mixture is heated in the atmospheric air for about from 1 hour to 10 hours at a temperature of from 200 to 1000° C., preferably from 300 to 500° C., and more preferably from 350 to 450° C. In the purification step, the calcined product obtained in the calcination step is suspended in weakly alkaline pure water, then left to stand still for a certain time, and the precipitate is recovered. This precipitate is lithium-containing manganese oxide having a spinel crystal structure. In the case of storing lithium-containing manganese oxide having a spinel crystal structure, the precipitate recovered through a filtration treatment or the like may be stored in a cool and dark place in a wet state. In addition, when lithium-containing manganese oxide having a spinel crystal structure is required to be subjected to a drying treatment, it can be dried in the air at about from 120 to 150° C. In addition, when synthesizing hydrogen-containing manganese oxide through an acid treatment step, lithium-containing manganese oxide having a spinel crystalline structure is suspended in an acidic solution such as an aqueous solution of dilute hydrochloric acid, followed by solid-liquid separation, thereby obtaining a hydrogen-containing manganese oxide powder. Hydrogen-containing manganese oxide powder having a spinel crystal structure is stored in a cool and dark place in a wet state. This powder should not be subjected to a drying treatment. The reason for this is because the crystal structure of the adsorbent changes to the crystal structure of lambda-type manganese dioxide which does not contain an ion exchangeable hydrogen ion when a reaction proceeds that the hydrogen ion in the crystal structure is transpired from the crystal as water by the drying treatment, and the adsorptivity to the tritium ion in water exhibited by the adsorbent decreases as a result.

Hydrogen- or lithium-containing manganese oxide having a spinel crystal structure obtained by a series of the steps described above constitutes the tritium adsorbent. Needless to say, hydrogen- or lithium-containing manganese oxide having a spinel crystal structure synthesized by a method other than the one described above also constitutes a tritium adsorbent.

It is preferable that the particle size of the primary particles of hydrogen- or lithium-containing manganese oxide having a spinel crystal structure is in a range of from 20 to 70 nm from the viewpoint of tritium adsorption capacity. In order to obtain a particle size within such a range, the calcination temperature may be set to be in a range of from 350° C. to 450° C. in the calcination step described above.

The tritium adsorbent may be used as the hydrogen- or lithium-containing manganese oxide powder having a spinel crystal structure described above, or it may be used as a membrane construct composed of the powder and a resin binder and further as an electrode construct. In the case of a membrane construct, for example, it may be formed as a porous membrane.

In addition, in the case of an electrode construct, for example, it can also be constituted by an electrode having hydrogen- or lithium-containing manganese oxide having a spinel crystal structure on the surface of an electro conductive metal. The tritium adsorbent constituted by such an electrode is constituted as an electrode having an electro conductive metal such as platinum and lithium-containing manganese oxide having a spinel crystal structure. Lithium-containing manganese oxide having a spinel crystal structure can be fixed onto the surface of an electro conductive metal using an electro conductive paint or the like. It is possible to fix lithium-containing manganese oxide having a spinel crystal structure onto the surface of the electro conductive metal mesh, for example, by coating an electro conductive paint mixed with lithium-containing manganese oxide powder having a spinel crystal structure on the surface of an electro conductive metal mesh and drying it. It is possible to obtain a tritium adsorbent constituted by an electrode having hydrogen-containing manganese oxide having a spinel crystal structure on the surface of an electro conductive metal by immersing this tritium adsorbent in a dilute acid in a state of being fixed on the surface of the electro conductive metal mesh with an electro conductive paint.

In the adsorption and separation of tritium from tritium-containing water using a tritium adsorbent powder constituted by hydrogen or lithium-containing manganese oxide having a spinel crystal structure in Examples 1 and 2 to be described later, a phenomenon was observed that manganese constituting the tritium adsorbent eluted into the tritium-containing water as the adsorption of tritium proceeded. It is considered that such a phenomenon is caused as manganese constituting the tritium adsorbent is reduced by β-ray emitted from tritium adsorbed to the spinel crystal structure. On the contrary, in the tritium adsorbent constituted by an electrode described above, it is possible to collect the electrons derived from β-ray emitted from the adsorbed tritium into the electro conductive paint and the electro conductive metal and to discharge the electrons from the tritium adsorbent constituted by an electrode to the ground through the conducting wire such as a copper wire, and thus it is possible to suppress the reduction of manganese constituting the adsorbent. In this manner, it is possible to decrease the elution of manganese from the adsorbent by connecting the tritium adsorbent constituted by an electrode to the ground, and thus an extended utilization lifespan as a tritium adsorbent can be expected. In addition, a tritium adsorbent constituted by an electrode is brought into contact with tritium-containing water by being immersed in the tritium-containing water and adsorbs tritium, and it is then possible to easily recover the adsorbent in the form of an electrode from the tritium-containing water by an operation of pulling the tritium adsorbent out of the tritium-containing water. In this manner, the adsorbent constituted by an electrode allows simple separation of tritium-containing water from the tritium adsorbent, and thus it allows simple and quick solid-liquid separation without missing the timing at which the tritium concentration in tritium-containing water that is the target of the treatment is decreased as compared to a method in which the solid-liquid separation of the powdery adsorbent from the tritium-containing water is conducted by a centrifugation method or the like. In addition, it is possible to conduct a treatment to adsorb and remove tritium stepwise from tritium-containing water in a short time by repeating the operation of bringing the tritium adsorbent after tritium adsorption into contact with a dilute acid solution to supplement the adsorbent with a hydrogen ion while dissolving the tritium adsorbed to the adsorbent in the dilute acid solution and then bringing the tritium adsorbent into contact with the tritium-containing water again. Furthermore, it is also possible to transfer and separate tritium from tritium-containing water to an aqueous solution of a dilute acid through an electrode membrane by disposing the tritium adsorbent constituted by an electrode as the electrode membrane to partition between the tritium-containing water tank and the aqueous dilute acid solution tank.

The tritium adsorbent of the present embodiment is a chemical adsorption means which does not require a complicated reactor as compared to a physical separation means of tritium in water of the prior art which utilizes a small difference in boiling point or mass between water ($H_2O$) and water isotope isomers ($T_2O$, THO) and does not require the addition of energy such as heat or electricity, and thus it is inexpensive. Hence, by the present method, it is possible to easily and inexpensively realize the separation of tritium in a great amount of contaminated water containing tritium at a concentration of about $10^6$ Bq/L that is hardly realized by the method of the prior art that is intended to treat tritium at a high concentration. Inexpensive and highly efficient separation and removal of tritium in water is possible, for example, by monitoring the tritium concentration using an existing flow type liquid scintillation counter which can monitor the radioactive concentration in real time while circulating water which contains tritium, is to be treated, and is stored in a surge tank between the adsorption tank in which the water is brought into contact with the present adsorbent and the surge tank and building a circulation system to discharge treated water at the time point at which the tritium concentration in the treated water is decreased to a concentration dischargeable to the public water areas on the basis of the laws and regulations and to return the treated water to the surge tank when the concentration is not sufficiently decreased.

The adsorption mechanism of tritium by the tritium adsorbent of the present embodiment is considered to be based on the adsorption reaction of the tritium ion ($^3T^+$) to the present adsorbent and the adsorption of tritium ion ($^3T^+$) generated from the oxidation reaction ($OT^- \rightarrow {}^3T^+ + 2e^- + (1/2)O_2$) of a hydroxide ion ($OT^-$) containing tritium which takes place on the surface of the present adsorbent which contains manganese oxide exhibiting high oxidizing power as the main component. In general, the degree of dissociation of the water molecule is significantly low, and thus tritium in water is mostly present as water molecules ($T_2O$, THO) but not as ions. The present adsorbent promotes the dissociation reaction (for example, $T_2O \rightarrow {}^3T^+ + OT^-$, $THO \rightarrow H^+ + OT^-$, $THO \rightarrow {}^3T^+ + OH^-$) of the tritiated water molecule ($T_2O$, THO) by adsorbing both of $^3T^+$ and $OT^-$ in tritium-containing water. As a result, it is considered that an effect is obtained that all the chemical species ($^3T^+$, $OT^-$, $T_2O$, THO) of tritium present in water are adsorbed and separated from the water to the solid phase of the present adsorbent. As a matter of fact, in the results described in the following Examples 1 to 3 (FIGS. 4, 5, 10, and 12,), from 12 to 45% of the total tritium amount in the tritium-containing water subjected to the respective adsorption experiments is adsorbed and removed from the water by the present adsorbent. These high tritium adsorption amounts are much higher than the tritium amount based on the abundance of the $^3T^+$ and $OT^-$ contained in the tritium-containing water subjected to the experiment in the initial state before the addition of the adsorbent thereto. For this reason, the adsorption mechanism that the dissociation reaction of the water molecule containing tritium described above is promoted by the present adsorbent and tritium in water is trapped into the present adsorbent as a tritium ion is also experimentally demonstrated by the present invention. In addition, even in a case in which tritium-containing water contains a component other than the tritium ion, it can be expected to be able to selectively adsorb and separate the tritium ion ($^3T^+$) in water which contains other components together since only a hydrogen ion ($H^+$), a deuterium ion ($D^+$), a lithium ion ($Li^+$), and a tritium ion ($^3T^+$) which have a smaller ionic radius as compared to the ions of other components can intercalate to the spinel crystal structure constituting the present tritium adsorbent.

It is considered that the present tritium adsorbent adsorb the tritium ion in water based on the ion exchange reactions represented by the following Chemical Formulas (1), (2), and (3). Chemical Formulas (1) and (2) represent a reaction using hydrogen-containing manganese oxide ($H_xMn_2O_4$) having a spinel crystal structure as the tritium adsorbent, and Chemical Formula (3) represents a reaction using lithium-containing manganese oxide ($Li_xMn_2O_4$) having a spinel crystal structure as the tritium adsorbent.

[Chem. 1]

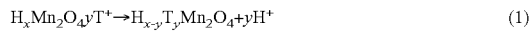

$$H_xMn_2O_4 + yT^+ \rightarrow H_{x-y}T_yMn_2O_4 + yH^+ \quad (1)$$

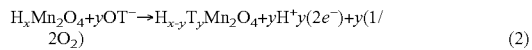

$$H_xMn_2O_4 + yOT^- \rightarrow H_{x-y}T_yMn_2O_4 + yH^+ + y(2e^-) + y(1/2 O_2) \quad (2)$$

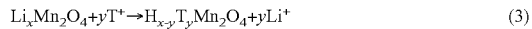

$$Li_xMn_2O_4 + yT^+ \rightarrow H_{x-y}T_yMn_2O_4 + yLi^+ \quad (3)$$

All of the reactions represented by Chemical Formulas (1), (2), and (3) above indicate that the tritium ion in water transfers into the spinel crystal structure through the ion exchange between the hydrogen ion or lithium ion contained in the spinel crystal structure of manganese oxide and the tritium ion in water and is further trapped into the solid phase by a weak covalent bond (strong hydrogen bond) with the oxygen atom in the crystal, and the tritium concentration in water decreases as a result. It is pointed out in the following literatures that, in the inside of the crystal of spinel-type manganese oxide, the hydrogen ion ($H^+$) is bound to the oxygen atom by a weak covalent bond (also referred to as the strong hydrogen bond) and a conductivity of hydrogen ion is exhibited according to the concentration gradient of the hydrogen ion in the inside of the crystal. Koyanaka, H.; Ueda, Y.; Takeuchi, K.; Kolesnikov, A. I., Effect of crystal structure of manganese dioxide on response for electrolyte of a hydrogen sensor operative at room temperature, Sens. Act. B 2013, 183, 641-647. Hence, in the present specification, an expression of the "adsorption" of tritium by hydrogen-containing manganese oxide and lithium-containing manganese oxide which have a spinel crystal structure is used, but the expression includes the definition as the "absorption" and "conductor" of the tritium ion by hydrogen-containing manganese oxide and lithium-containing manganese oxide which have a spinel crystal structure. In Chemical Formulas (1) to (3) above, the symbol x denotes the molar ratio of the hydrogen ion or lithium ion to other components which are contained in the adsorbent and y denotes the molar ratio of tritium adsorbed to the adsorbent to other components. In particular, on the right side of Chemical Formula (2), extra electrons which do not constitute charge neutrality in between the right side and the left side are present. These extra electrons interfering with the charge neutrality are considered to be responsible for promoting the reduction and dissolution of manganese in the adsorbent together with the electron derived from beta ray emitted from tritium when the adsorbent is applied to tritium-containing water as a powder. These extra electrons are discharged to the ground by constituting the present adsorbent as an electrode. For this reason, it is possible to suppress the dissolution of manganese from the adsorbent in the case of constituting the present adsorbent as an electrode.

Next, an embodiment of the method for separating tritium in water of the present invention will be described.

First, the tritium adsorbent described above is brought into contact with tritium-containing water. Subsequently, the pH of the tritium-containing water is adjusted to be acidic in the following manner. By this, it is possible to adsorb tritium in tritium-containing water to the adsorbent and to decrease the tritium concentration in the tritium-containing water.

In the present embodiment, acidic tritium-containing water is brought into contact with the tritium adsorbent in the case of using a tritium adsorbent ($H_xMn_2O_4$) having hydrogen-containing manganese oxide. At that time, it is preferable that the pH of tritium-containing water is 4.0 or more and less than 7.0 in order to effectively adsorb tritium in the tritium-containing water to the adsorbent. This is because, in a case in which the pH of tritium-containing water is from 1 to 2 to be strongly acidic, the hydrogen ion ($H^+$) concentration on the right side in Chemical Formula (1) is high and thus the adsorption reaction of tritium by Chemical Formula (1) hardly proceeds. As a result, stable adsorption of tritium to the adsorbent ($H_xMn_2O_4$) hardly takes place in a strongly acidic aqueous solution. In addition, in a case in which the pH of tritium-containing water is 7.0 or more to be neutral and alkaline, the adsorption of tritium originated from $OT^-$ by Chemical Formula (2) proceeds but a reduction reaction to change manganese constituting the crystal of the adsorbent to a divalent manganese ion ($Mn^{2+}$) that is highly water-soluble by the extra electrons generating effect on the right side in Chemical Formula (2) proceeds. For this reason, it is considered that, under the condition having a pH of 7.0 or more, the solubility of hydrogen-containing manganese oxide on the surface increases as compared to the condition having a pH of less than 7.0, the adsorbed tritium ion re-dissolves in water, and the lifespan of the adsorbent is also shortened by dissolution of the crystal structure. In particular, coloration to yellow-brown of the sample water taken from the tritium-containing water having a pH of 7 or more and a hydrogen-containing manganese oxide adsorbent powder suspended therein by the dissolution of manganese is observed. However, the effect of dissolving manganese by the extra electrons of Chemical Formula (2) can be significantly decreased by constituting the adsorbent in the form of an electrode so as to discharge the extra electrons. In addition, in a case in which a lithium ion ($Li^+$) and a tritium ion ($^3T^+$) are dissolved in water to be treated at the same time, adsorption of the lithium ion and the tritium ion to the adsorbent ($H_xMn_2O_4$) competes with each other under the condition having a pH of 7 or more. For this reason, the adsorptivity of tritium ion decreases under the condition having a pH of 7 or more. Consequently, in the method for separating tritium of present embodiment, it is preferable to adjust the pH of tritium-containing water to 4.0 or more and less than 7.0 in the case of using the tritium adsorbent ($H_xMn_2O_4$) having hydrogen-containing manganese oxide. More preferably, it is desirable to adjust the pH to 5.5 or more and 6.5 or less.

On the other hand, in the case of using a tritium adsorbent ($Li_xMn_2O_4$) having lithium-containing manganese oxide, the tritium concentration in tritium-containing water decreases by ion exchange between the lithium ion ($Li^+$) contained in the adsorbent and the tritium ion ($^3T^+$) in water in Chemical Formula (3) above. At that time, in a case in which the pH of tritium-containing water is from 1 to 2 to be strongly acidic, the lithium ion contained in the adsorbent ($Li_xMn_2O_4$) is immediately substituted with the hydrogen ion ($H^+$), and thus the chemical composition of the adsorbent changes to that of the hydrogen-containing manganese oxide tritium adsorbent ($H_xMn_2O_4$). Hence, in order to accelerate the ion exchange between the lithium ion in the adsorbent and the tritium ion in water based on Chemical Formula (3), it is preferable to have the reaction of Chemical Formula (3) above as the main reaction of tritium adsorption while suppressing a change of lithium-containing manganese oxide ($Li_xMn_2O_4$) to the hydrogen-containing manganese oxide ($H_xMn_2O_4$) by applying the adsorbent ($Li_xMn_2O_4$) under a weakly acidic condition having a pH of 4.0 or more and less than 7.0. Particularly in a case in which tritium-containing water that is the target of treatment contains a lithium ion, the ion exchange reaction of the lithium ion to the tritium ion proceeds along with the dissolution of lithium from the adsorbent since the lithium-containing manganese oxide tritium adsorbent ($Li_xMn_2O_4$) contains a lithium ion in the solid phase at a high concentration of about 30 mg/g or more. At that time, the lithium ion in the liquid phase does not transfer into the solid phase of the adsorbent, and thus selective adsorption of the tritium ion to the lithium ion takes place. Hence, in a case in which tritium-containing water to be the target water of treatment contains a lithium ion, higher adsorption of tritium as compared to the tritium adsorbent having hydrogen-containing manganese oxide can be expected. On the other hand, under a condition in which the pH of tritium-containing water is 7.0 or more, the lithium ion in the crystal of lithium-containing manganese oxide hardly elutes, and thus the reaction of Chemical Formula (3) hardly proceeds to the right side that is the direction in which the tritium ion is adsorbed to lithium-containing manganese oxide. For this reason, adsorption of the tritium ion to the lithium-containing manganese oxide tritium adsorbent ($Li_xMn_2O_4$) hardly takes place under the condition having a pH of 7.0 or more. Consequently, in the method for separating tritium of the present embodiment, it is preferable to adjust the pH of tritium-containing water to 4.0 or more and less than 7.0 in the case of using the tritium adsorbent ($Li_xMn_2O_4$) having lithium-containing manganese oxide. More preferably, it is desirable to adjust the pH to 4.0 or more and 6.0 or less.

As described above, when adsorbing the tritium ion using the tritium adsorbent ($H_xMn_2O_4$ or $Li_xMn_2O_4$) of the present invention, a reaction is utilized in which tritium is transferred and adsorbed from a liquid phase to a solid phase by chemical ion exchange between the hydrogen ion ($H^+$) or lithium ion ($Li^+$) contained in the solid phase of the tritium adsorbent and the tritium ion ($^3T^+$) in tritium-containing water. For this reason, the amount of the hydrogen ion or lithium ion contained in the solid phase of the present adsorbent gradually decreases while eluting into water as the adsorption of tritium ion proceeds, and as a result, the adsorptivity to the tritium ion exhibited by the present adsorbent ($H_xMn_2O_4$ or $Li_xMn_2O_4$) also deteriorates. Thus, the adsorptivity to the tritium ion is recovered by supplementing the adsorbent with a hydrogen ion or a lithium ion from the outside in the present invention.

The method for supplementing the tritium adsorbent of the present invention with a hydrogen ion from the outside may be various. The supplementation of the tritium adsorbent with a lithium ion is also the same.

An acid treatment is considerable as simple supplementation of the tritium adsorbent with a hydrogen ion. In general, for example, a dilute acid having a pH of about from 1 to 2 is suitably used. Specifically, the used tritium adsorbent or the tritium adsorbent being used is supplemented with a hydrogen ion, for example, by being subjected to the acid treatment using a dilute acid and the adsorptivity to the tritium ion is recovered. Specifically, for example, a method in which the used tritium adsorbent ($H_xMn_2O_4$) in the form of an electrode is immersed in an aqueous solution of dilute hydrochloric acid for about 10 minutes to be supplemented with a hydrogen ion again and then applied to the tritium-containing water again or a method in which the tritium adsorbent ($H_xMn_2O_4$) in the form of an electrode is disposed in between the tritium-containing water and an aqueous solution of a dilute acid as an ion exchange membrane to be supplemented with a hydrogen ion all the time and to maintain the adsorptivity to tritium in water is preferably considerable.

As the acid treatment, for example, a small amount of a dilute acid solution such as dilute hydrochloric acid solution, dilute sulfuric acid solution, or dilute nitric acid solution is added to the tritium adsorbent. By this, the tritium ion is eluted from the tritium adsorbent, and the tritium adsorbent (namely, the adsorbent having a decreased content of hydrogen ion) after use is supplemented with a hydrogen ion again so that the tritium adsorbent after use can be regenerated as a tritium adsorbent ($H_xMn_2O_4$).

In addition, alternatively, the tritium adsorbent ($Li_{x-y}T_yMn_2O_4$) to which tritium is adsorbed is brought into contact with a weakly alkaline aqueous solution containing a lithium ion. By this, the tritium ion is eluted from the tritium adsorbent to which tritium is adsorbed into the aqueous solution containing a lithium ion, and the tritium adsorbent (namely, the adsorbent having a decreased content of lithium ion) after use is supplemented with a lithium ion again so that the tritium adsorbent after use can be regenerated as a tritium adsorbent ($Li_xMn_2O_4$).

In addition, in the present embodiment, the tritium-containing water that has been brought into contact with the tritium adsorbent may be circulated so as to be brought into contact with the tritium adsorbent again. Here, the concentration of radioactivity derived from tritium in the tritium-containing water is constantly measured using a flow type liquid scintillation counter or the like, the tritium-containing water is discharged at the time point at which the radioactive concentration thereof is decreased to the reference value (for example, concentration dischargeable to the public water areas on the basis of the laws and regulations), the tritium-containing water is continuously circulated so that the tritium-containing water is repeatedly brought into contact with the tritium adsorbent until the radioactive concentration reaches a value that is equal to or less than the reference value in a case in which the radioactive concentration does not reach the reference value. This allows inexpensive and highly efficient separation and removal of tritium in water.

In handling of the adsorbent ($H_{x-y}T_yMn_2O_4$) after adsorption of tritium, it is required to be prevented that tritium is transpired into the atmospheric air as a water isotope isomer (HTO) by the ion exchange reaction between tritium adsorbed to the adsorbent and a hydrogen ion contained in the water molecule in the atmospheric air. For this reason, in the tritium recovery facility using the present adsorbent, dehumidifying equipment and a system to dehumidify and recover a water isotope containing tritium that is transpired in the atmospheric air in the recovery facility are installed from the viewpoint of safety.

Hereinafter, the present invention will be described in more detail with reference to Examples, but the present invention is not limited to these Examples at all.

EXAMPLES

Example 1

<Synthesis of Tritium Adsorbent>

In accordance with the following procedure, a tritium adsorbent constituted by lithium-containing manganese oxide having a spinel crystal structure and a tritium adsorbent constituted by hydrogen-containing manganese oxide having a spinel crystal structure were synthesized.

<Raw material and mixing> Powders of reagent manganese carbonate hydrate ($MnCO_3.nH_2O$) and reagent lithium hydroxide hydrate ($LiOH.H_2O$) manufactured by Wako Pure Chemical Industries, Ltd. are mixed together in a weight ratio of 2 to 1 and thoroughly mixed at room temperature until the powder mixture is blackened.

<Calcination> The powder mixture is heated at 390° C. for 6 hours using an electric furnace (FO-410 manufactured by YAMATO) in the atmospheric air and then cooled to room temperature.

<Purification> The powder after natural cooling is suspended in an appropriate amount of ion exchanged pure water in a container such as a beaker, and the aggregate of the powder is disentangled by applying an ultrasonic wave through the wall of the container such as a beaker. Unreacted manganese carbonate remains as turbidity in the supernatant of the ion exchanged pure water since it has a low specific gravity, and lithium-containing manganese oxide having a spinel crystal structure and a heavy specific gravity settles on the bottom of the container. After the suspension is left to stand still for a certain time, manganese carbonate in the supernatant is removed using an aspirator or the like, and the precipitated lithium-containing manganese oxide powder having a spinel crystal structure is recovered. At this time, the pH of the ion exchange purified water in which the powder is suspended is maintained to be weakly alkaline to alkaline. This series of purification treatment is repeated three times to remove manganese carbonate remained as an unreacted substance in the calcination step.

<Storage> The lithium-containing manganese oxide powder having a spinel crystal structure that is recovered through the filtration treatment or the like is stored in a cool and dark place in a wet state. The powder is subjected to the drying treatment at about 120° C. for 12 hours when the drying treatment is required.

<Acid treatment> A hydrogen-containing manganese oxide powder having a spinel crystal structure is obtained by suspending 1 g of lithium-containing manganese oxide having a spinel crystal structure, for example, in 1 L of an aqueous solution of dilute hydrochloric acid at a concentration of 0.5 M, continuously stirring for about 1 hour using a magnetic stirrer, and then subjecting the solution to the solid-liquid separation using vacuum filtration. Incidentally, the chemical compositions of lithium-containing manganese oxide and hydrogen-containing manganese oxide that are obtained by the present synthesis method are chemically analyzed in H. Koyanaka, O. Matsubaya, Y. Koyanaka, and N. Hatta, Quantitative correlation between Li absorption and H content in Manganese Oxide Spinel λ-$MnO_2$, Journal of Electroanalytical chemistry 559 (2003) 77-81 to be ($Li_{1.15}Mn_2O_{4.6}$) and ($H_{1.35}Mn_2O_{4.1}$), respectively.

Figure 2:
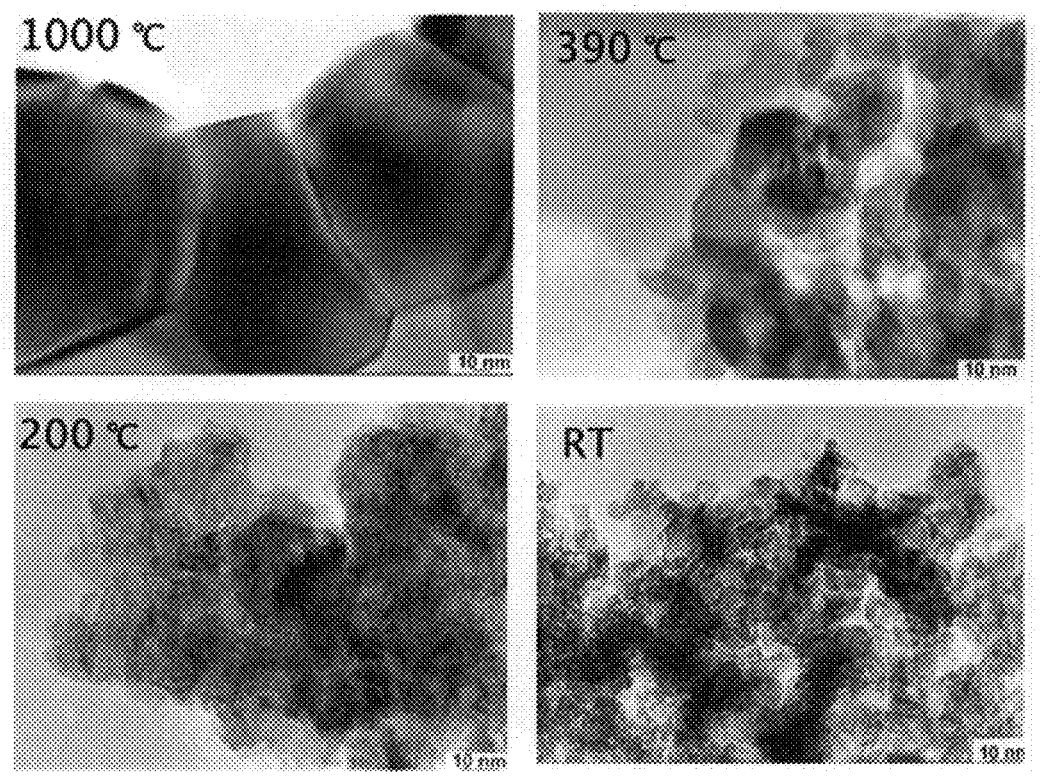
FIG. 2 illustrates an image of a lithium-containing tritium adsorbent taken using a transmission electron microscope.
Figure 3:
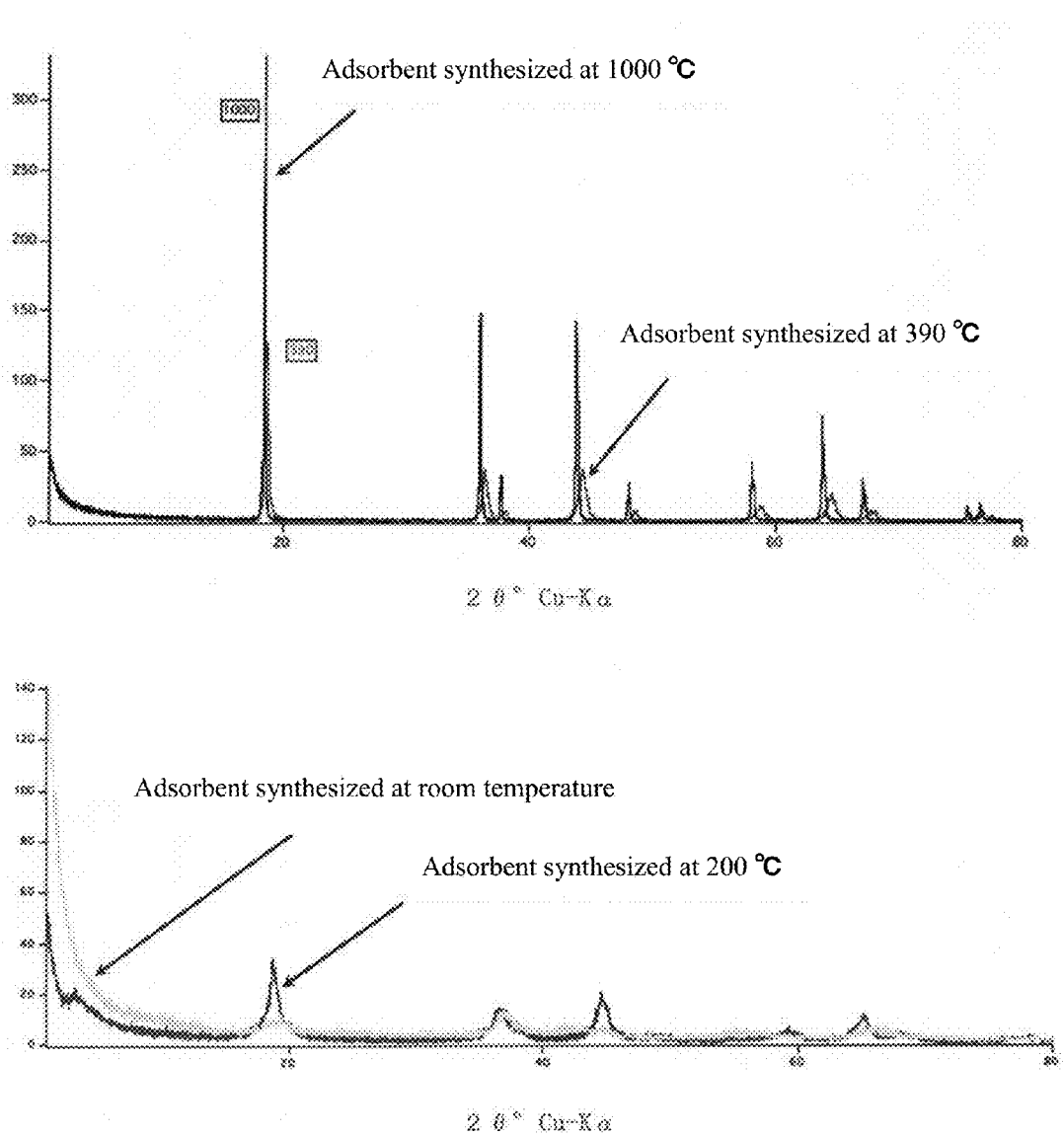
FIG. 3 illustrates X-ray diffraction patterns of lithium-containing tritium adsorbents obtained at different calcining temperatures.

By the operation described above, a tritium adsorbent constituted by hydrogen-containing manganese oxide having a spinel crystal structure and a primary particle size of from 20 to 70 nm and a tritium adsorbent constituted by lithium-containing manganese oxide having a spinel crystal structure were obtained. The X-ray diffraction patterns of hydrogen-containing manganese oxide having a spinel crystal structure and lithium-containing manganese oxide having a spinel crystal structure thus obtained are illustrated at the upper part and the lower part of FIG. 1, respectively. In FIG. 1, the diffraction pattern for hydrogen-containing manganese oxide illustrated at the upper part has slightly shifted to the higher angle side as compared to the diffraction pattern of lithium-containing manganese oxide illustrated at the lower part, and an effect of slightly decreasing the crystal size is exerted as the lithium ion is eluted by subjecting lithium-containing manganese oxide to the acid treatment and then replaced with a hydrogen ion having a smaller ionic size than the lithium ion. In addition, these analysis results indicate that each of the adsorbents has a peak at approximately the same position as the X-ray diffraction pattern of manganese oxide having a spinel crystal structure which exhibits high crystallinity, and reported in J. C. Hunter, Preparation of a new crystal structure of manganese dioxide: Lambda-$MnO_2$, Journal of Solid State Chemistry 39 (1981) 142-147. In addition, the images of lithium-manganese oxide having a spinel crystal structure obtained in a case in which the calcination temperature is set to 390° C. at which ion exchange properties suitable for the present adsorbent are obtained in the calcination step and lithium-containing manganese oxide having a spinel crystal structure obtained at a different calcination temperature taken using a transmission electron microscope are illustrated in FIG. 2. In this FIG. 2, it is possible to compare the difference in primary particle size obtained by changing the calcination temperature. Incidentally, the "RT" in FIG. 2 denotes the room temperature. In addition, the X-ray diffraction pattern of lithium-containing manganese oxide illustrated in FIG. 2 is illustrated in FIG. 3. It can be seen that each lithium-containing manganese oxide illustrated in FIG. 2 has a spinel crystal structure by comparing the respective diffraction patterns in FIG. 3 with one another. The X-ray diffraction peak in FIG. 3 is broadened and the intensity thereof decreases as the calcination temperature is lower, and from FIG. 2, it can be seen that the size of the primary particles to be obtained is finer as the calcination temperature is lower. In general, the chemical reactivity is enhanced when the particle size is fine as the specific surface area increases. In FIG. 2, primary particles finer as compared to the adsorbent calcined at 390° C. are obtained in a case in which the calcination temperature is 200° C. and in the case of room temperature synthesis in which the raw materials are only mixed but not subjected to the calcination. However, the proportion of the surface increases as compared to the proportion of the bulk in the too fine primary particles, and thus the influence of the amorphous structure on the surface in which the crystal structure is disturbed increases. For this reason, the tritium adsorption capacity derived from the spinel crystal structure is favorable in the adsorbent calcined at 390° C. The specific surface area of the adsorbent calcined at 390° C. was measured to be about 33 m²/g by a nitrogen gas adsorption method. In addition, in the case of lithium-containing manganese oxide having a spinel crystal structure obtained through calcination at 1000° C., not only the specific surface area thereof is simply small but also the ion exchange reactivity between the lithium ion in the crystal and the hydrogen ion in the liquid phase significantly deteriorates. For this reason, lithium-containing manganese oxide having a spinel crystal structure of from 20 to 70 nm which is obtained through calcination at 390° C. or lithium-containing manganese oxide having a spinel crystal structure of from 20 to 70 nm which is obtained through calcination at 390° C. and hydrogen-containing manganese oxide obtained by subjecting the lithium-containing manganese oxide to the acid treatment described above are preferable as the tritium adsorbent.

<Tritium adsorption test>

Tritium-containing water for experiment having a radioactive concentration of 5606.87 Bq/mL was prepared in a glass beaker by diluting 40 μL of a standard reagent of tritiated water (DuPont 5 mCi, 5.0 g, 1.0 Ci/g Apr. 25, 1985) with 100 mL of distilled water at room temperature (23.6° C., pH: 5.61). Hence, it is calculated that 560687 Bq of radioactivity derived from tritium is generated in total from 100 mL of the tritium-containing water for experiment. For the measurement of radioactive concentration, a liquid scintillation counter (Liquid Scintillation Analyzer TRI-CARB 2100TR PACKARD (USA)) was used. To 1 mL of the sample of the tritium-containing water for experiment, 10 mL of a surfactant (Perkin Elmer PICO-FLUOR PLUS) containing a fluorescent agent that emitted light as β-ray as a scintillator was added, and the radioactive concentration derived from tritium per 1 mL of the sample was measured. As a blank sample, 1 mL of distilled water which used in the experiment was pretreated in the same manner, the radioactivity derived from tritium was measured, and 1.1 Bq/mL was detected. For this reason, it has been confirmed that 1.1 Bq/mL is the detection limit of radioactivity derived from tritium added to the tritium-containing water for experiment in the present radioactivity measuring method. For the pH adjustment of the tritium-containing water for experiment, 0.01 M, 0.1 M, and 0.5 M aqueous solutions of reagent dilute hydrochloric acid and 0.01 M, 0.5 M, and 1 M aqueous solutions of reagent sodium hydroxide were used. For the confirmation of pH and water temperature, a pH meter (pH/DO meter, D-55 glass electrode model 9678 manufactured by HORIBA, Ltd.) and pH test paper were used.

<Adsorption Test Using Hydrogen-Containing Manganese Oxide Adsorbent Having Spinel Crystal Structure>

Next, 0.73 g of lithium-containing manganese oxide ($Li_{1.15}Mn_2O_{4.6}$) having a spinel crystal structure of which the X-ray diffraction pattern is illustrated at the lower part in FIG. 1 was added to 1 L of 0.5 M dilute hydrochloric acid at room temperature, and the mixture was stirred for 1 hour using a stirring bar coated with the Teflon (registered trademark) resin and a magnetic stirrer. By this acid treatment, lithium contained in the lithium-containing manganese oxide was eluted and the chemical composition thereof was changed to hydrogen-containing manganese oxide ($H_{1.35}Mn_2O_{4.1}$) having a spinel crystal structure. Hydrogen-containing manganese oxide ($H_{1.35}Mn_2O_{4.1}$) having a spinel crystal structure in a wet state was recovered (0.5 g as the weight when dried at 120° C. for 5 hours) on glass fiber filter paper (GS-25 manufactured by ADVANTEC MFS, Inc.) from the 0.5 M dilute hydrochloric acid through vacuum filtration. This hydrogen-containing manganese oxide having a spinel crystal structure in a wet state was suspended in 100 mL of the tritium-containing water for experiment having a radioactive concentration of 5606.87 Bq/mL and held for 10 minutes while stirring with a magnetic stirrer. At that time, the pH of tritium-containing water for experiment was changed from 5.61 of the initial value before suspension of the adsorbent to 2.96 immediately after the suspension. The dropwise addition of an aqueous solution of sodium hydroxide was started at that time point, the pH of the tritium-containing water for experiment was maintained at from 5.75 to 5.91, 2 mL of the sample of the tritium-containing water for experiment was taken from the suspension by filtration using a filtration instrument (DISMIC-25AS) which was manufactured by ADVANTEC MFS, Inc. and equipped with glass fiber filter paper of a type to be attached to a luer lock syringe at the time point at which 10 minutes elapsed from the start of dropwise addition of sodium hydroxide and the pH was 5.8, 10 mL of a surfactant was added to 1 mL of the sample that was accurately weighed and preparatively separated from 2 mL of the sample, and the radioactive concentration was measured using a liquid scintillation counter, and 5177.58 Bq/mL was obtained as a result. Furthermore, the pH was maintained at from 5.72 to 5.88 in the same manner, and the radioactivity from 1 mL of the sample of the tritium-containing water for experiment which was taken in the same manner at the time point at which 20 minutes elapsed as further 10 minutes elapsed after the first sampling was analyzed, and 3861.12 Bq/mL was obtained as a result. Hence, the radioactive concentration decreased from 5606.87 Bq/mL of the initial radioactive concentration to 3861.12 Bq/mL in about 20 minutes. Accordingly, the decreased concentration of radioactivity for 1 mL of the sample thus obtained was 1745.75 Bq/mL. Hence, in 100 mL of the tritium-containing water for experiment, tritium corresponding to 174575 Bq of radioactivity was transferred from the liquid phase of the tritium-containing water for experiment to the solid phase of the adsorbent by the adsorption effect of the hydrogen-containing manganese oxide adsorbent having a spinel crystal structure. It was found that 174575 Bq was adsorbed per 0.5 g of the dry weight of the adsorbent in about 20 minutes. From the above results, the maximum adsorption rate of tritium radioactivity per 1 g of the dry weight of the adsorbent reached 349150 Bq/g, and high tritium adsorption capacity of the present adsorbent was confirmed. The value of the radioactivity decreased by adsorption was converted to the number of moles of tritium by the following Equation (4) to be $0.325 \times 10^{-9}$ moL. Hence, the mass of the adsorbed tritium obtained by multiplying the number of mass of tritium of 3 by the number of moles was 0.975 ng.

[Chem. 2]

$$-dN/dt = (ln2/T) \times N \qquad (4)$$

Here, in Equation (4), $-dN/dt$ denotes the number of decay of tritium per 1 second (Bq); ln denotes a natural logarithm symbol; T denotes the half-life period of tritium of 12.32 (years); and N denotes the number of atoms of tritium.

Furthermore, the pH of the tritium-containing water for experiment was kept at from 5.70 to 5.92, and the tritium-containing water for experiment was stirred and held for 100 minutes from the first addition of sodium hydroxide. The tritium-containing water for experiment was sampled and the radioactive concentration thereof was measured in the same manner as above at a time point at which a certain times elapsed during the 100 minutes, and as a result, a change in radioactive concentration for 1 mL of each sample illustrated in FIG. 4 was obtained.

Figure 4:
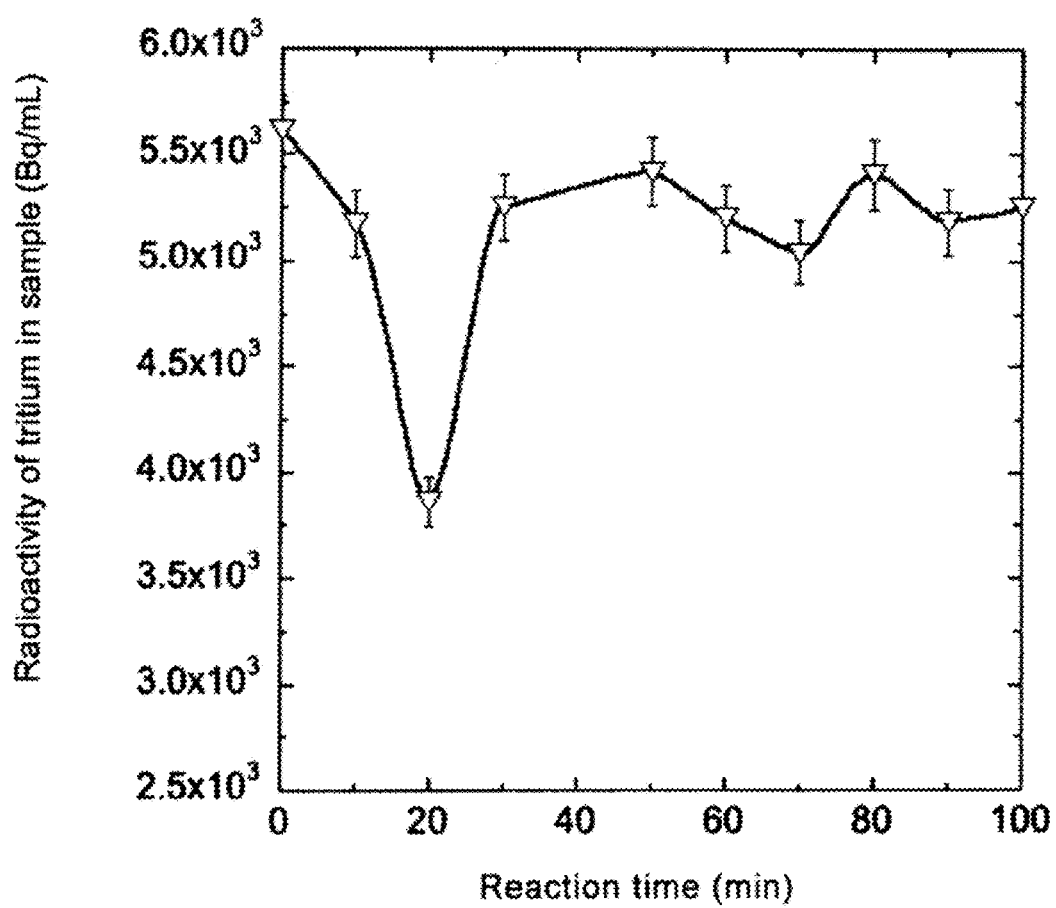
FIG. 4 illustrates a change in tritium concentration due to a hydrogen-containing manganese oxide adsorbent powder.

From FIG. 4, it has been indicated that the adsorbed tritium is eluted again in the tritium-containing water for experiment after the elapse of 20 minutes as compared to the decreasing tendency of radioactive concentration until the time point at which 20 minutes has elapsed. It is considered that this is because of the effect that the tritium ion adsorbed in the crystal structure reduced manganese to a highly soluble divalent manganese ion while emitting β-ray (electron beam) and the fact that the ion exchangeable hydrogen ion contained in the adsorbent is insufficient in order to transfer the tritium ion from the liquid phase to the solid phase of the adsorbent at the time point at which 20 minutes has elapsed. In addition, the adsorbed tritium converts to helium, $^3$He of a rare gas through β-decay, and thus there is a possibility that a tritium ion is inhibited from newly penetrating into the crystal structure as helium generated in the crystal structure of the adsorbent accumulates and the internal pressure of the penetration pathway of the tritium ion in the crystal structure of the adsorbent increases. As a phenomenon to demonstrate the discussion on the reduction effect described above, coloration to pale yellow-brown which indicated the dissolution of manganese was observed in the tritium-containing water for experiment that was sampled in a state in which the tritium adsorption radioactivity per 1 g of the adsorbent exceeded about from 10000 to 30000 Bq/g. Such coloration is a phenomenon that has not been observed at all in the past research reports on the adsorption of lithium ion to the adsorbent under the same pH condition (for example, H. Koyanaka, O. Matsubaya, Y. Koyanaka, and N. Hatta, Quantitative correlation between Li absorption and H content in Manganese Oxide Spinel λ-MnO$_2$, Journal of Electroanalytical Chemistry 559 (2003) 77-81.), and it is considered that this is an effect due to the adsorption of tritium to the adsorbent.

Taking the above results into account, when the present adsorbent is applied to actual tritium-containing water, it is required to separate the treated water from the adsorbent at the time point at which the tritium radioactive concentration in the treated water indicates that the adsorption of tritium has most proceeded by the addition of the adsorbent by installing an existing flow type liquid scintillation counter to the treatment tank in which the present adsorbent is brought into contact with tritium-containing water and monitoring the radioactive concentration in the tritium-containing water being treated in real time. Substantial adsorption and separation of tritium in water is possible by building a system that circulates and treats the treated water in the treatment tank when the tritium concentration in the treatment tank is not sufficiently decreased, transferring the treated water to the discharge tank at the time point at which the tritium concentration is decreased to a concentration dischargeable to the public water areas on the basis of the laws and regulations, and discharging the treated water to the public water areas.

<Adsorption Test Using Lithium-Containing Manganese Oxide Adsorbent Having Spinel Crystal Structure>

Tritium-containing water for experiment having a radioactive concentration of 5718.13 Bq/mL was prepared in a glass beaker by diluting 40 μL of a standard reagent of tritiated water (DuPont 5 mCi, 5.0 g, 1.0 Ci/g 4/25/1985) with 100 mL of distilled water at room temperature (22.9° C.). Hence, it is calculated that 571813 Bq of radioactivity derived from tritium is generated in total from 100 mL of the tritium-containing water for experiment. For the measurement of radioactive concentration, a liquid scintillation counter (Liquid Scintillation Analyzer TRI-CARB 2100TR PACKARD (USA)) was used. To 1 mL of the sample of the tritium-containing water for experiment, 10 mL of a surfactant (Perkin Elmer PICO-FLUOR PLUS) containing a fluorescent agent that emitted light as β-ray as a scintillator was added, and the radioactive concentration derived from tritium per 1 mL of the sample was measured. For the pH adjustment of the tritium-containing water for experiment, 0.01 M, 0.1 M, 0.5 M, and 1 M aqueous solutions of reagent dilute hydrochloric acid and 0.01 M, 0.1 M, 0.5 M, and 1 M aqueous solutions of reagent sodium hydroxide were used. For the confirmation of pH and water temperature, a pH meter (pH/DO meter, D-55 glass electrode model 9678 manufactured by HORIBA, Ltd.) and pH test paper were used.

Figure 5:
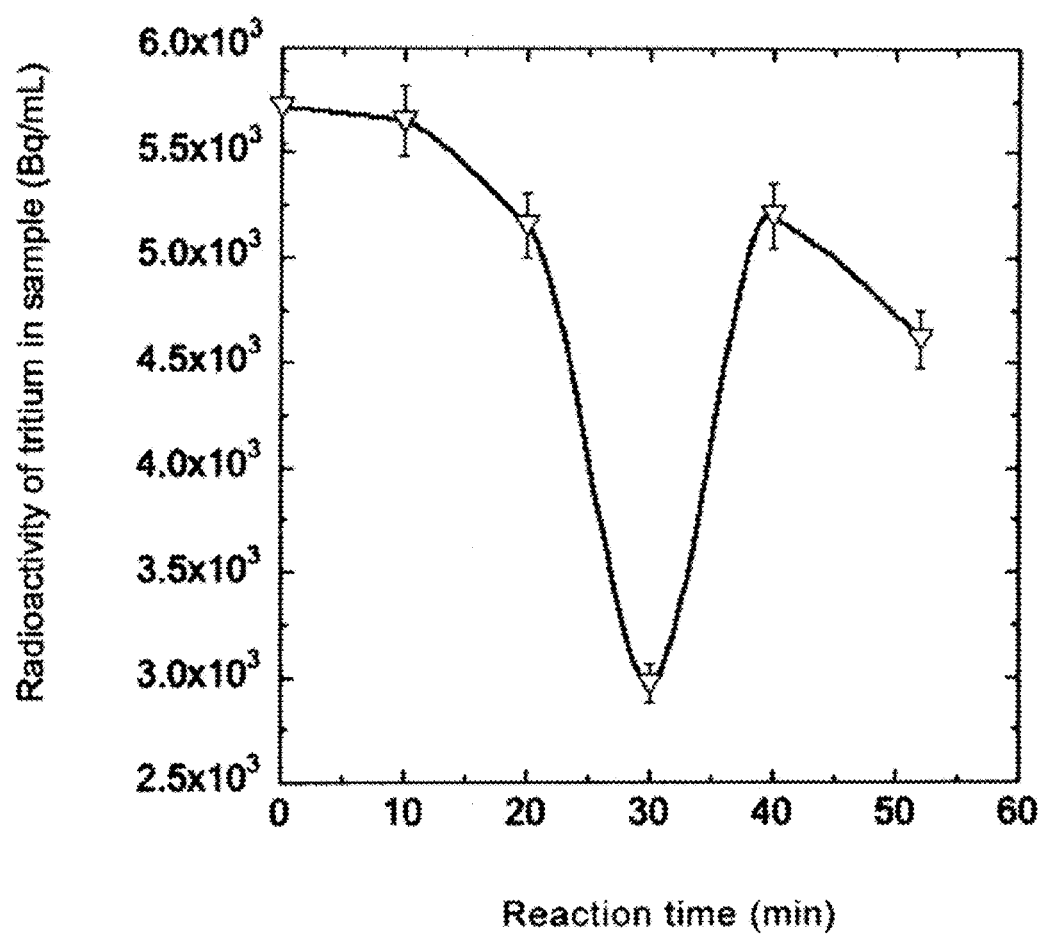
FIG. 5 illustrates a change in tritium concentration due to a lithium-containing manganese oxide adsorbent powder.

Next, about 0.725 g (about 0.5 g as dry weight) of lithium-containing manganese oxide having a spinel crystal structure of which the X-ray diffraction pattern was illustrated at the lower part in FIG. 1 was suspended in the tritium-containing water for experiment. The adsorbent is wetted with a weakly alkaline to alkaline aqueous solution in the purification process described above, and thus the pH of the tritium-containing water for experiment quickly increased from 5.58 before suspension to about pH 9.5 after suspension of the adsorbent when the adsorbent was suspended in 100 mL of the tritium-containing water for experiment. The pH was adjusted to from 3 to 4 for a time of about 5 minutes by adding a 0.01 M, 0.5 M, or 1 M aqueous solution of dilute hydrochloric acid to this dropwise in an appropriate amount and at an appropriate time. Thereafter, the tritium-containing water for experiment was continuously stirred using a magnetic stirrer and a stirring bar coated with the Teflon (registered trademark) resin while adjusting the pH thereof so as to converge to from 5.75 to 5.98 by adding a 0.01 M, 0.1 M, 0.5 M, or 1 M aqueous solution of reagent sodium hydroxide thereto in an appropriate amount and at an appropriate time. At each time point at which 10 minutes, 20 minutes, 30 minutes, 40 minutes, or 50 minutes elapsed from the time point at which the adjustment of pH by the dropwise addition of dilute hydrochloric acid was started, 2 mL of the sample of the tritium-containing water for experiment was taken by filtration using a filtration instrument (DISMIC-25AS) which was manufactured by ADVANTEC MFS, Inc. and equipped with glass fiber filter paper of a type to be attached to a luer lock syringe, 10 mL of the surfactant described above was added to 1 mL of the sample that was accurately weighed and preparatively separated from 2 mL of the sample, and the radioactive concentration thereof was measured using a liquid scintillation counter. The results obtained from the above experiment are illustrated in FIG. 5. In FIG. 5, it can be seen that the radioactive concentration of the sample of the tritium-containing water for experiment taken after the elapse of 30 minutes was most decreased to be 2971.28 Bq/mL. The concentration decreased from the initial radioactive concentration reached 2746.85 Bq/mL at the time point at which 30 minutes elapsed as the initial radioactive concentration of the tritium-containing water for experiment was 5718.13 Bq/mL. Accordingly, the decreased radioactivity in 100 mL of the tritium-containing water for experiment was 274685 Bq. In other words, the adsorption amount of tritium per 0.5 g (dry weight) of the adsorbent added in the experiment reached 274685 Bq, and a result corresponding to 549370 Bq/g was obtained when the radioactive concentration was converted to the radioactivity removal rate per 1 g of the adsorbent.

In addition, coloration to pale yellow-brown which indicated the dissolution of manganese was observed in the tritium-containing water for experiment that was sampled at a pH of 6.5 or more and the tritium-containing water for experiment that was sampled in a state in which the radioactivity removal rate of tritium per 1 g of the adsorbent exceeded about from 10000 to 30000 Bq/g.

<Influence of Drying Treatment for Hydrogen-Containing Manganese Oxide Adsorbent on Tritium Adsorption>

Figure 6:
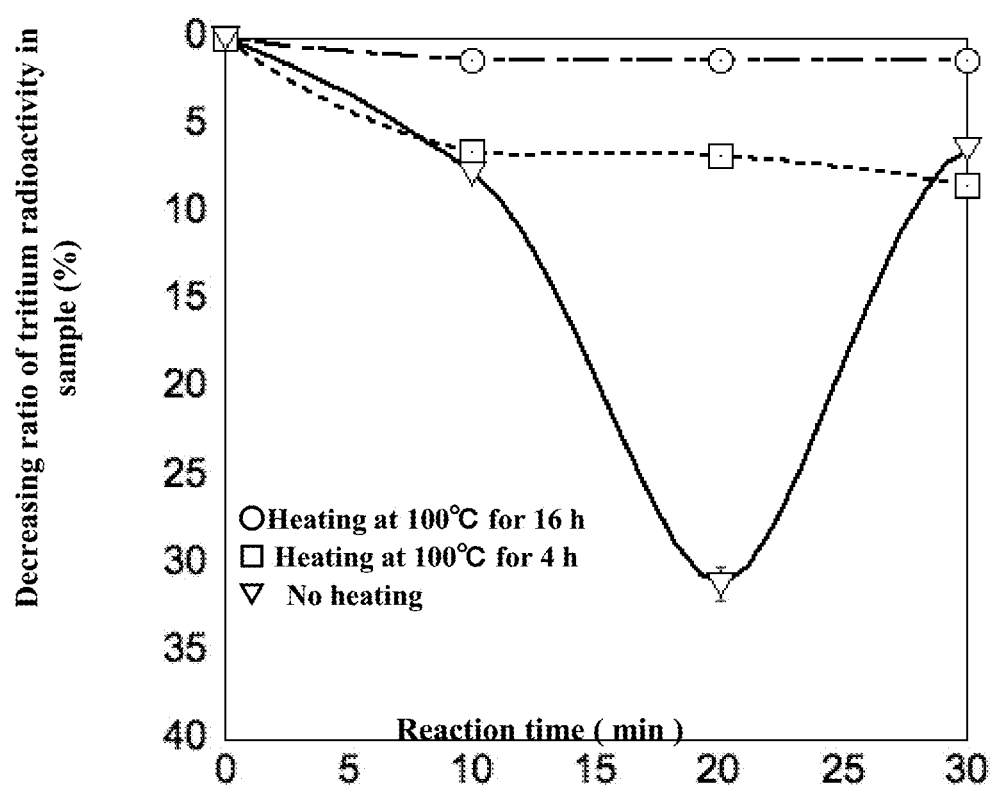
FIG. 6 illustrates an influence of the drying treatment for a hydrogen-containing manganese oxide adsorbent powder on the adsorption of tritium.

FIG. 6 illustrates the results of the experiment for confirming the influence of the drying treatment for the hydrogen-containing manganese oxide adsorbent before being added to tritium-containing water on the tritium adsorption through comparison of the decrease rate of tritium concentration. In other words, three kinds of powder samples of the hydrogen-containing manganese oxide adsorbent powder (0.5 g) were prepared by not conducting the drying treatment, conducting the drying treatment at 100° C. for 4 hours, and conducting the drying treatment at 100° C. for 16 hours, and a change in decrease rate of the tritium concentration when the powder samples were applied to tritium-containing water under the same conditions other than the drying treatment was compared with one another. As can be clearly seen from the results illustrated in FIG. 6, the decrease rate of tritium concentration in the sample of hydrogen-containing manganese oxide subjected to the drying treatment at 100° C. is 10% or less as compared to the sample that has not been subjected to the drying treatment, and the adsorption capacity thereof is clearly lower as compared to the result for the sample that has not been subjected to the drying treatment. This is because the ion exchangeable hydrogen ion contained in the hydrogen-containing manganese oxide adsorbent evaporates as water so as to be lost from the adsorbent and the tritium adsorption capacity deteriorates as a result. For this reason, hydrogen-containing manganese oxide having a spinel crystal structure should be stored in a wet state obtained after the step of acid treatment without conducting the drying treatment.

Comparative Example

<Comparison Experiment Using Another Manganese Oxide as Tritium Adsorbent>

Figure 7:
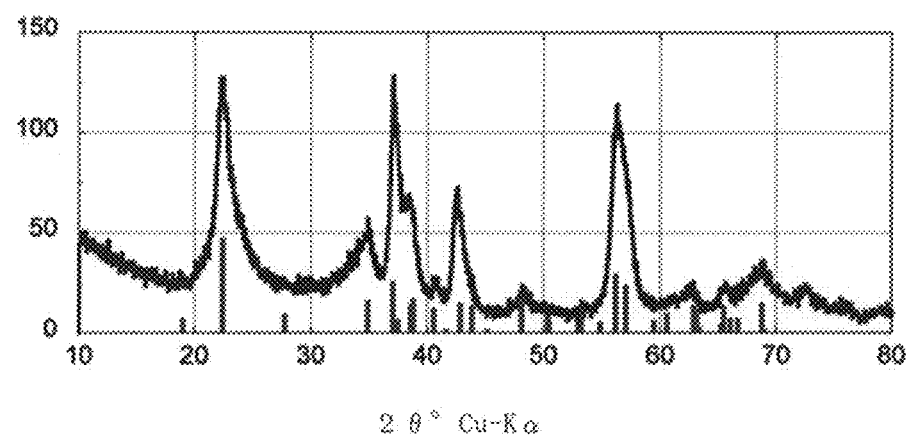
FIGS. 7(a) to 7(c) illustrate X-ray diffraction patterns of manganese oxide having a crystal structure other than the spinel type.
Figure 7:
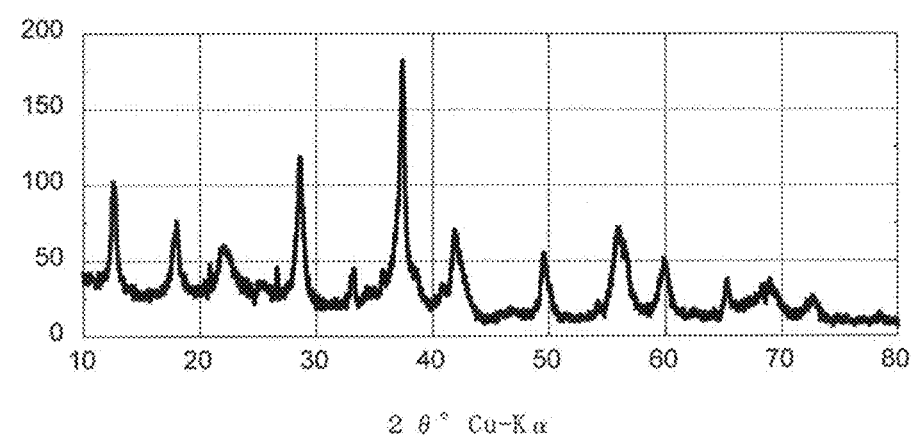
Figure 7:
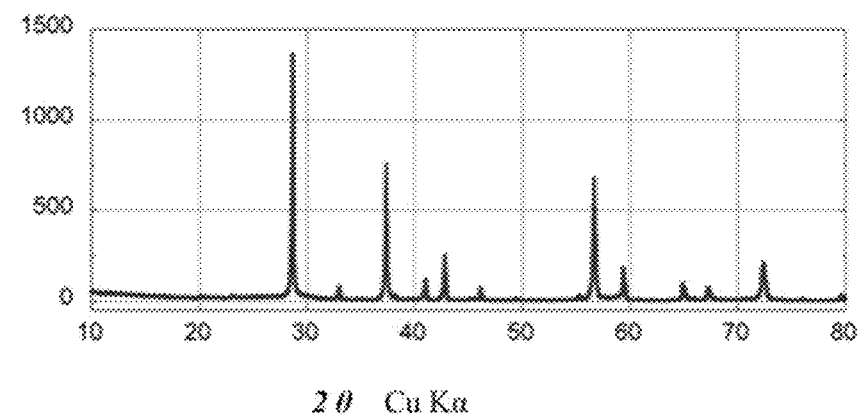
Figure 8:
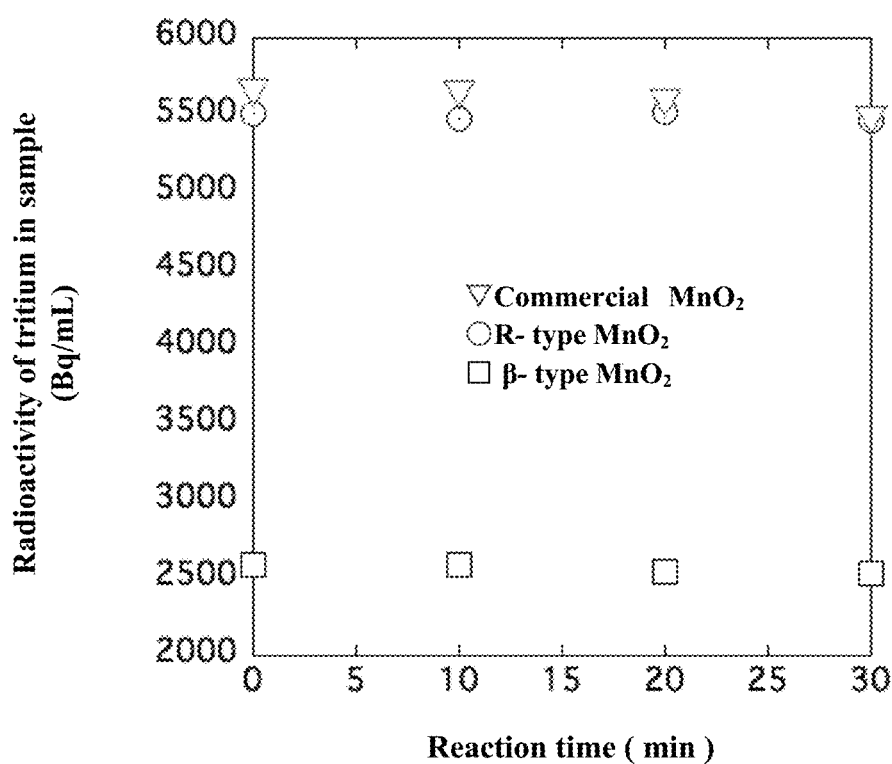
FIG. 8 illustrates a change in tritium concentration due to a manganese oxide powder having a crystal structure other than the spinel type.

Manganese oxide having a crystal structure other than a spinel crystal structure as a tritium adsorbent was tested in order to confirm that the tritium adsorption effect described in Example 1 above is unique functionality of hydrogen-containing manganese oxide having a spinel crystal structure and lithium-containing manganese oxide having a spinel crystal structure. The same tritium adsorption experiment as in Example 1 was conducted by using 0.5 g of each of (a) manganese dioxide (the theoretical peak positions of the ideal ramsdellite type manganese dioxide are shown as bars at the lower part) having a ramsdellite type (orthorhombic structure) crystal structure, (b) commercially available manganese dioxide (manganese oxide IV chemically treated product manufactured by Wako Pure chemical Industries, Ltd.) having a number of crystal structures mixed, and (c) manganese dioxide having a β-type (rutile structure) crystal structure of which the X-ray diffraction patterns were illustrated in FIGS. 7(a) to 7(c) as the comparison target. Tritium-containing water for experiment (initial pH: 5.68, water temperature: 24.5° C., initial radioactive concentration: 5509 Bq/m L) and tritium-containing water for experiment (initial pH: 5.63, water temperature: 25.5° C., initial radioactive concentration: 5644 Bq/m L) were prepared, and the manganese dioxide having a ramsdellite type crystal structure and the commercially available manganese dioxide having a number of crystal structures mixed were tested, respectively. In addition, in the experiment of the β-type manganese dioxide, the experiment was conducted under the conditions having an initial radioactive concentration of 2510 Bq/mL, an initial pH of 5.85, and a water temperature of 25.0° C. The pH of the tritium-containing water for experiment in any of the experiments was maintained at from 5.50 to 5.98 by adding an aqueous solution of sodium hydroxide thereto dropwise while stirring using a magnetic stirrer in the same manner as in Example 1. At the time point at which 10 minutes, 20 minutes, and 30 minutes elapsed from the time point at which the pH adjustment was started, the tritium-containing water for experiment was sampled by filtration, and a change in radioactive concentration was investigated in the same manner as in Example 1. The experimental results are illustrated in FIG. 8. Only a decrease of about 66 Bq/mL from the initial radioactive concentration was observed at most in these manganese oxides tested as the comparison target. Hence, it has been confirmed that the adsorptivity to tritium is strongly dependent on the crystal structure and based on the unique property of the hydrogen-containing manganese oxide having a spinel crystal structure and the lithium-containing manganese oxide having a spinel crystal structure described in Example 1.

Example 2

<Tritium Adsorption Test Using Hydrogen-Containing Manganese Oxide Adsorbent Having Spinel Crystal Structure in Electrode Form>

Figure 9:
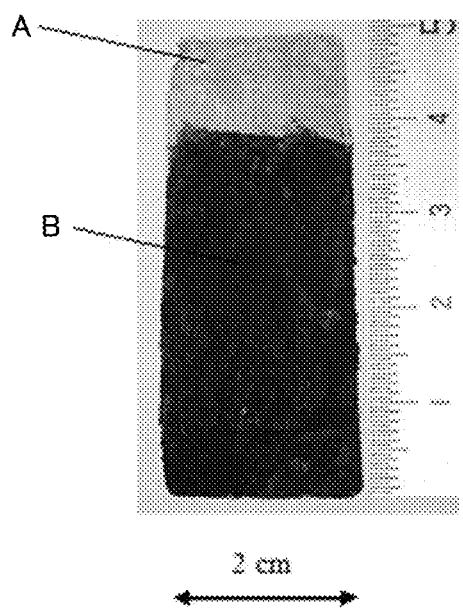
FIGS. 9(a) to 9(c) are a schematic diagram illustrating an embodiment of a tritium adsorbent constituted as an electrode.
Figure 9:
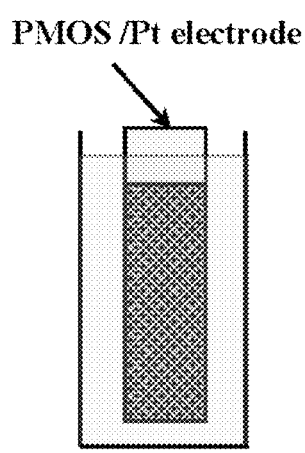
Figure 9:
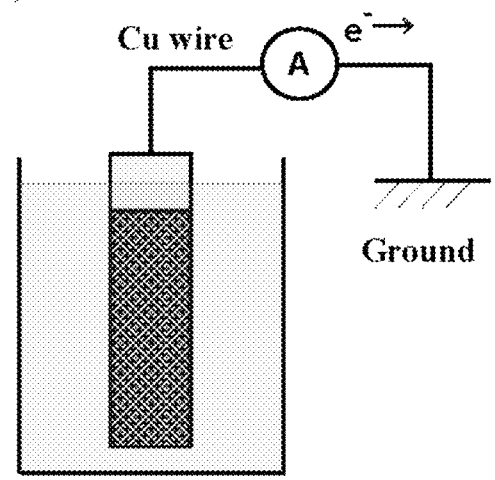

The lithium-containing manganese oxide powder (chemical composition: $Li_{1.15}Mn_2O_{4.6}$) having a spinel crystal structure of which the X-ray diffraction pattern was illustrated at the lower part in FIG. 1 was dried for 12 hours by keeping it at 120° C. in a dryer (EYELA WFO-401 manufactured by TOKYO RIKAKIKAI CO., LTD.) and the atmospheric air. As illustrated in FIG. 9(a), 0.1 g of the dried adsorbent powder was mixed with an electro conductive paint, coated on the surface (4 cm×2 cm) of a platinum mesh (size 5 cm×2 cm×0.16 mm, 100 mesh) A, and dried for 3 hours by keeping it at 150° C. in a dryer and the atmospheric air. By this treatment, it was possible to fabricate a platinum electrode B supporting a powder of lithium-containing manganese oxide having a spinel crystal structure (PMOS) on the surface in a thickness of 0.3 mm. The electrode is illustrated in FIG. 9(a). Incidentally, the paint XC-12 which had a carbon filler mixed in an epoxy resin and manufactured by FUJIKURA KASEI CO., LTD. was used as the electro conductive paint.

Tritium-containing water for experiment having a radioactive concentration of 3574.73 Bq/mL was prepared in a glass beaker by diluting 40 µL of a standard reagent of tritiated water (DuPont 5 mCi, 5.0 g, 1.0 Ci/g 4/25/1985) with 100 mL of distilled water at room temperature (20° C.). Hence, it is calculated that 357473 Bq of radioactivity derived from tritium is generated in total from 100 mL of the tritium-containing water for experiment. For the measurement of radioactive concentration, a liquid scintillation counter (Liquid Scintillation Analyzer TRI-CARB 2100TR PACKARD (USA)) was used. As a blank sample, 1 mL of distilled water which used in the experiment was pretreated in the same manner, the radioactivity derived from tritium was measured, and 1.1 Bq/mL was detected. For this reason, it has been confirmed that 1.1 Bq/mL is the detection limit of radioactivity derived from tritium added to the tritium-containing water for experiment in the present radioactivity measuring method. From the tritium-containing water for experiment, 1.2 mL of a sample was taken using a filter unit with a 0.2 mesh (DISMIC-25AS manufactured by ADVANTEC MFS, Inc.) and a disposable syringe (Terumo SS-02Sz), and 1 mL of the sample that was accurately weighed and preparatively separated from this sample. To 1 mL of the sample, 10 mL of a surfactant (Perkin Elmer PICO-FLUOR PLUS) containing a fluorescent agent that emitted light as β-ray as a scintillator was added. For the sample to which the scintillator was added, the radioactive concentration derived from tritium contained in 1 mL of the sample was measured using the liquid scintillation counter. For the pH adjustment of 100 mL of the tritium-containing water for experiment, 0.01 M, 0.1 M, and 0.5 M aqueous solutions of reagent sodium hydroxide were used. For the measurement of pH and water temperature, a pH meter (pH/DO meter, D-55 glass electrode model 9678 manufactured by HORIBA, Ltd.) and pH test paper were used.

Upon the experiment, first, a platinum mesh electrode (FIG. 9(a)) was fabricated in which 0.1 g of the dried powder of lithium-containing manganese oxide having a spinel crystal structure was fixed and bonded onto the surface with an electro conductive paint, and it was immersed in 40 mL of 0.5 M dilute hydrochloric acid and stirred for 1 hour using a magnetic stirrer (FIG. 9(b)). By this acid treatment, the lithium ion was removed from the lithium-containing manganese oxide having a spinel crystal structure and a platinum mesh electrode supporting hydrogen-containing manganese oxide (chemical composition: $H_{1.35}Mn_2O_{4.1}$) having a spinel crystal structure on the surface was obtained. As illustrated in FIG. 9(c), this platinum mesh electrode supporting hydrogen-containing manganese oxide on the surface was immersed in 100 mL of tritium-containing water. The tritium-containing water was stirred using a magnetic stirrer and a stirring bar coated with the Teflon (registered trademark) while maintaining the pH of the tritium-containing water to from 5.5 to 6.0 by dropwise addition of an aqueous solution of reagent sodium hydroxide, 1.2 mL of a sample was taken from the tritium-containing water whenever a predetermined time elapsed, and a change in radioactive concentration in 1.0 mL of the sample preparatively separated from the taken sample was measured. In the present experiment, the electrode was electrically grounded to the ground through a copper wire during the experiment as illustrated in FIG. 9(c). In addition, the value of fine current flowing from the electrode to the ground was measured using the microammeter DSM-8104 manufactured by HIOKI E.E. Corporation.

Figure 10:
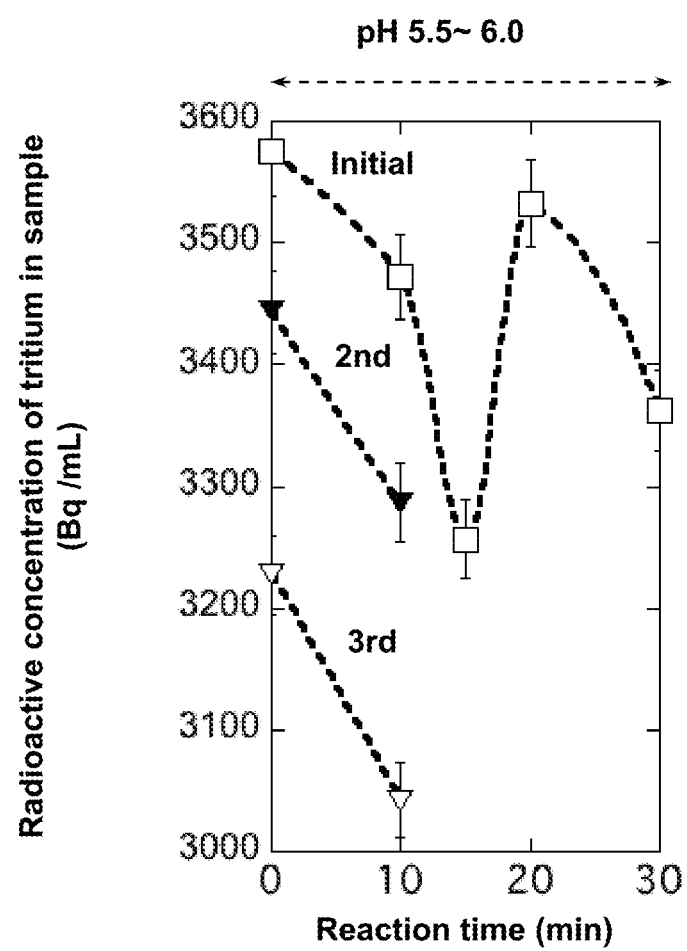
FIG. 10 illustrates a change in tritium concentration in water due to a hydrogen-containing manganese oxide electrode.

The result for the present experiment is illustrated on the curve denoted as the Initial in FIG. 10. The radioactive concentration in each sample decreased from 3575 Bq/mL to 3257 Bq/mL when 15 minutes elapsed, thereafter, it increased again and decreased again. The total amount of tritium that was adsorbed from 100 mL of the test water to the adsorbent when 15 minutes elapsed was calculated by multiplying 318 Bq/mL of the decrease value from the initial concentration by 100 times to be 31800 Bq. In Example 1 above, 174575 Bq of tritium was adsorbed over 20 minutes at most when 0.5 g of a hydrogen-containing manganese oxide powder having a spinel crystal structure was used as an adsorbent. On the contrary, in the present Example 2 in which about 0.1 g of the adsorbent was applied in the form of an electrode, a result was obtained that the maximum tritium adsorption amount per unit weight of the adsorbent was maintained at the same level as in Example 1 in which 0.5 g of the powder adsorbent was utilized. Furthermore, the coloration of the test water due to elution of manganese which was observed in the experiment of Example 1 at a pH of 6 or more was not observed in the present Example 2 in which the adsorbent was applied in the form of an electrode. This is considered as the effect obtained by releasing the electrons derived from β-ray emitted from the adsorbed tritium to the ground so as to prevent the reduction and elution of manganese constituting the adsorbent. It is considered that it is possible to extend the lifespan of the adsorbent as compared to the case of applying the adsorbent as a powder by the same effect. In addition, by the measurement of fine current, a current of a minus several hundred pico ampere level (it is expressed as minus due to the current value based on the electron flow toward the ground) was intermittently observed before a decrease in tritium concentration. It is considered that the current is one captures the discharge to the ground from the tritium adsorption electrode constituted by the present adsorbent, an electro conductive paint, and a platinum mesh.

Next, the electrode to which tritium was adsorbed by the experiment described above was immersed in 40 mL of diluted hydrochloric acid at a concentration of 0.5M illustrated in FIG. 9(b) for 10 minutes to elute tritium adsorbed to the adsorbent into the dilute acid. It was confirmed that the eluted amount of tritium into the dilute hydrochloric acid corresponded to about 10% of the adsorbed amount through the measurement by a scintillation counter.

Furthermore, the electrode from which tritium was desorbed by being immersed in the above dilute hydrochloric acid for 10 minutes was again brought into contact with the liquid left after completion of the above experiment in the experimental system in FIG. 9(c). In this manner, the results denoted as the 2nd and the 3rd in FIG. 10 were obtained by repeating immersion of the present electrode in tritium-containing water (10 minutes), desorption of tritium and supplement of the present electrode with a hydrogen ion through the acid treatment (10 minutes), and immersion of the present electrode in the tritium-containing water (10 minutes) again. As a result, in FIG. 10, a result that the tritium concentration decreased by 532 Bq/mL from 3575 Bq/mL of the initial concentration to 3043 Bq/mL was obtained by repeating 10 minutes of adsorption treatment with respect to the tritium-containing water three times. It is 53200 Bq when the present measurement result is converted to the decrease amount in 100 mL of the tritium-containing water used in the experiment. Accordingly, about 50000 Bq of tritium was removed by 3 times of adsorption treatment utilizing the electrode (4 cm×2 cm×0.3 mm) of the present Example. Consequently, in consideration of the adsorption time and the acid treatment time, the tritium adsorption efficiency per unit square meter of the electrode was calculated to be $3.3 \times 10^7$ Bq/m²h. The following advantages are obtained by forming the adsorbent into an electrode as compared to the application of the adsorbent as a powder adsorbent described in Example 1 that the solid-liquid separation is simple and the supplementation of the adsorbent with a hydrogen ion for the ion exchange with the tritium ion in the crystal thereof can be carried out through a simple acid treatment.

Example 3

<Tritium Adsorption Test Using Electrode of Hydrogen-Containing Manganese Oxide Adsorbent Having Spinel Crystal Structure as Tritium Separation Membrane>

Figure 11:
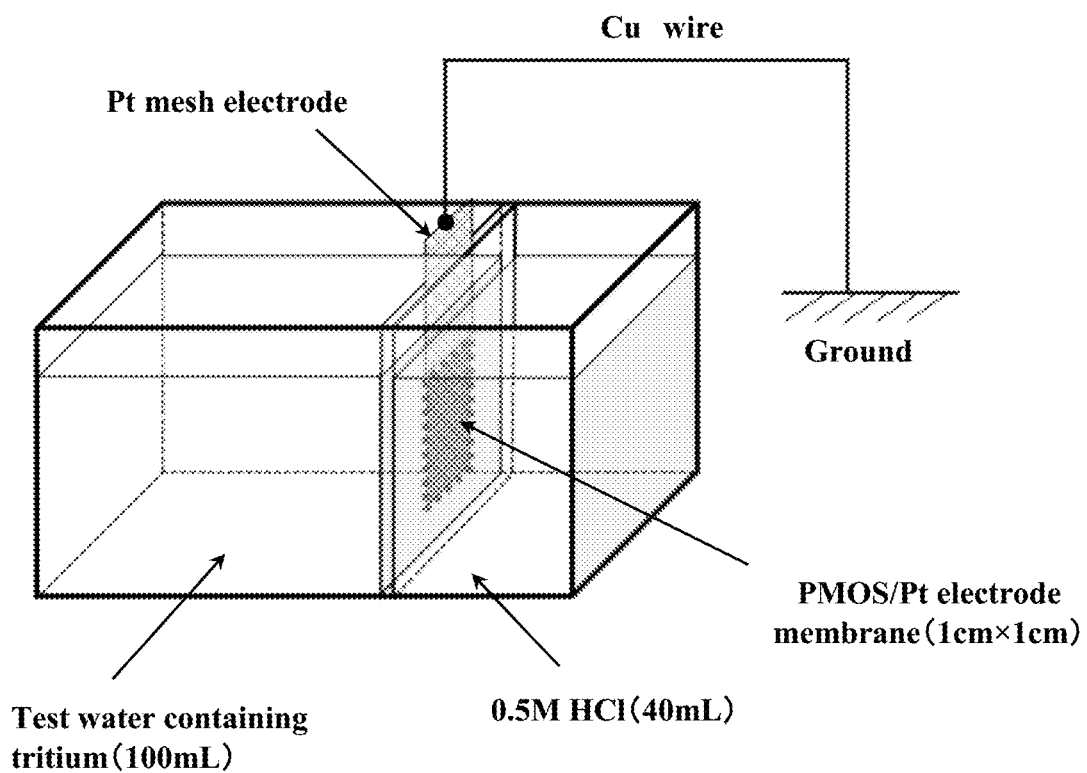
FIG. 11 is a schematic diagram illustrating an embodiment of a tritium adsorbent constituted as an electrode membrane.
Figure 12:
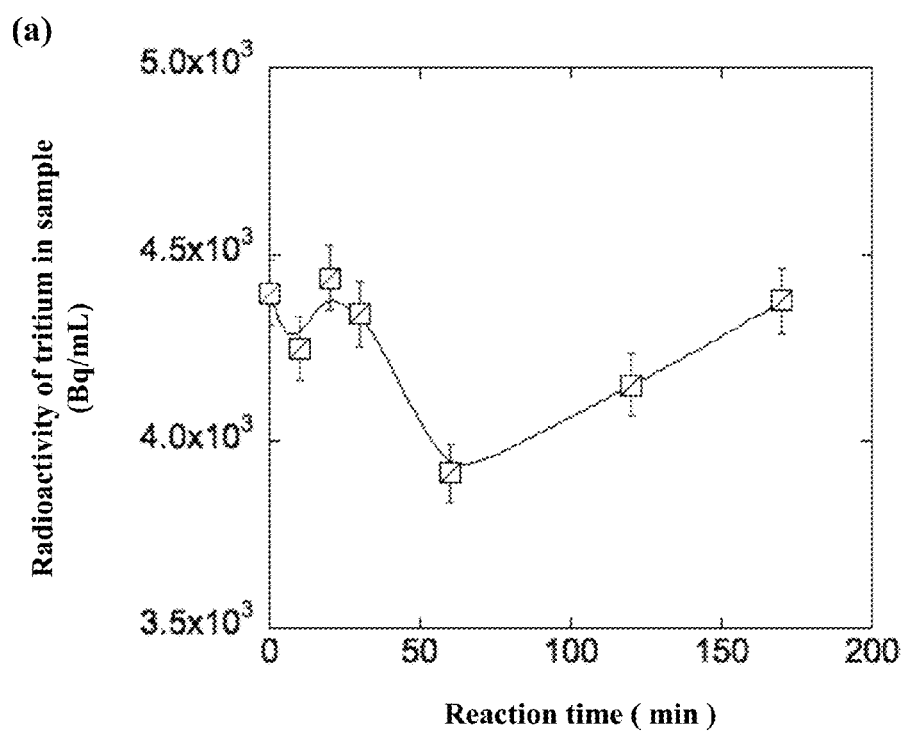
FIGS. 12(a) and 12(b) illustrate a change in tritium concentration in water due to a hydrogen-containing manganese oxide electrode membrane.
Figure 12:
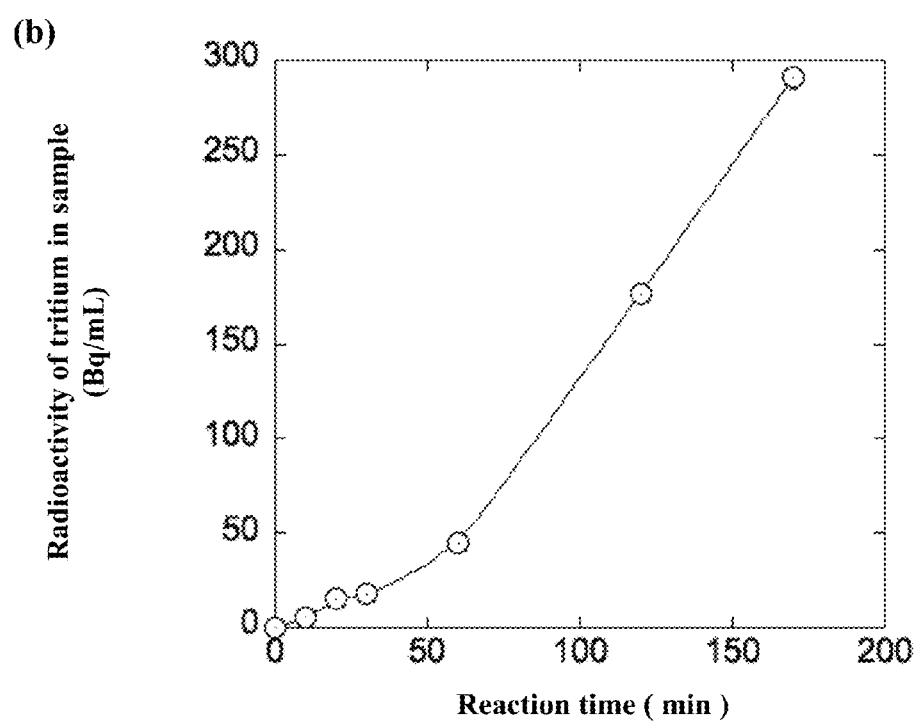

The present experimental system is illustrated in FIG. 11. A transparent acrylic water tank was partitioned into two tanks by an acrylic wall having an area (1 cm×1 cm) in which the hydrogen-containing manganese oxide adsorbent (chemical composition: $H_{1.35}Mn_2O_{4.1}$) having a spinel crystal structure in the form of an electrode was brought into contact with the tritium-containing water, the tank on the left side was filled with 100 mL of the tritium-containing water, and the tank on the right side was filled with 40 mL of dilute hydrochloric acid solution (manufactured by Wako Pure Chemical Industries, Ltd.) at a concentration of 0.5 M. In the experiment, the change in radioactive concentration of tritium was investigated at these two tanks for the tritium-containing water and the dilute hydrochloric acid solution.

Tritium-containing water for experiment having a radioactive concentration of 4396.4 Bq/mL was prepared in a glass beaker by diluting 40 μL of a standard reagent of tritiated water (DuPont 5 mCi, 5.0 g, 1.0 Ci/g 4/25/1985) with 100 mL of distilled water at room temperature (25.0° C.). Hence, it is calculated that 439640 Bq of radioactivity derived from tritium is generated in total from 100 mL of the tritium-containing water for experiment. For the measurement of radioactive concentration, a liquid scintillation counter (Liquid Scintillation Analyzer TRI-CARB 2100TR PACKARD (USA)) was used. To 1 mL of the sample for the tritium-containing water for experiment and the dilute hydrochloric acid, 10 mL of a surfactant (Perkin Elmer PICO-FLUOR PLUS) containing a fluorescent agent that emitted light as β-ray as a scintillator was added, and the radioactive concentration derived from tritium per 1 mL of the sample was measured. For the pH adjustment of the tritium-containing water for experiment, a 0.1 M aqueous solution of reagent sodium hydroxide was used. For the measurement of pH and water temperature, a pH meter (pH/DO meter, D-55 glass electrode model 9678 manufactured by HORIBA, Ltd.) and pH test paper were used. As a blank sample, 1 mL of distilled water which used in the experiment was pretreated in the same manner, the radioactivity derived from tritium was measured, and 1.0 Bq/mL was detected. For this reason, it has been confirmed that 1.0 Bq/mL is the detection limit of radioactivity derived from tritium added to the tritium-containing water for experiment in the present radioactivity measuring method.

Upon the experiment, first, the lithium-containing manganese oxide powder (chemical composition: $Li_{1.15}Mn_2O_{4.6}$) having a spinel crystal structure of which the X-ray diffraction pattern was illustrated at the lower part in FIG. 1 was dried for 12 hours by keeping it at 120° C. in a dryer (EYELA WFO-401 manufactured by TOKYO RIKAKIKAI CO., LTD.) and the atmospheric air. Next, 0.1 g of the dried adsorbent powder ($Li_{1.15}Mn_2O_{4.6}$) was mixed with an electro conductive paint, coated on the surface (4 cm×2 cm) of a platinum mesh (size 5 cm×2 cm×0.16 mm, 100 mesh), and dried for 3 hours by keeping it at 150° C. in a dryer and the atmospheric air. By this treatment, it was possible to fabricate (FIG. 9(a)) a platinum electrode supporting a powder of lithium-containing manganese oxide having a spinel crystal structure on the surface in a thickness of 0.3 mm. Incidentally, the paint XC-12 which contained a carbon filler mixed in an epoxy resin and manufactured by FUJIKURA KASEI CO., LTD. was used as the electro conductive paint. The surface of this electrode was exposed by 1 cm² for contacting to solutions, and the electrode was supported between a waterproof seal of a silicone rubber frame having a thickness of 0.5 mm and an acrylic plate frame, thereby constructing an electrode membrane dividing the acrylic tank into two tanks for experiment illustrated in FIG. 11. For the prevention of water leakage, each seam of the acrylic tank was coated with a silicon sealer and dried for 2 days. In addition, the adsorbent in the form of an electrode was grounded to the ground through a copper wire. The two tanks of the acrylic tank were filled with 0.5 M dilute hydrochloric acid solution for 24 hours before the start of the experiment, thereby lithium was eluted from the lithium-containing manganese oxide on the electrode membrane surface dividing the two tanks, thereby changing the composition thereof to hydrogen-containing manganese oxide (chemical composition: $H_{1.35}Mn_2O_{4.1}$).

Immediately before the start of the experiment, the 0.5 M dilute hydrochloric acid solution was removed from the two tanks, and the two tanks were sufficiently rinsed with distilled water, and filled with 100 mL of tritium-containing water and 0.5 M dilute hydrochloric acid solution, respectively. Next, the pH of the tritium-containing water was maintained at from 5.5 to 6.5 while stirring the tritium-containing water using a stirring bar coated with the Teflon (registered trademark) and a magnetic stirrer. Samples of the tritium-containing water and the 0.5 M dilute hydrochloric acid solution were taken from the respective tanks by 1 mL using a precise micropipette whenever a predetermined time elapsed, and the radioactive concentration in the sample was measured by the method described above. Incidentally, the pH of tritium-containing water was adjusted by dropwise addition of an aqueous solution of reagent sodium hydroxide.

The experimental results are illustrated in FIGS. 12(a) and 12(b). FIG. 12(a) illustrates a change in tritium concentration in tritium-containing water, and FIG. 12(b) illustrates a change in tritium concentration in 0.5 M dilute hydrochloric acid solution. From FIG. 12(a), it can be seen that the tritium concentration in the tritium-containing water decreased by 480.3 Bq/mL from 4396.4 Bq/mL of the initial concentration to 3916.1 Bq/mL when 60 minutes elapsed. In the experiment, 100 mL of tritium-containing water was used, and thus it was found that 48030 Bq of tritium was adsorbed to the electrode membrane tested in the present experiment. In addition, a result was also obtained that the tritium concentration in the 0.5 M dilute hydrochloric acid solution divided by the electrode membrane increased without fluctuating unlike the tritium-containing water side. This increase in tritium concentration in the 0.5 M dilute hydrochloric acid solution is considered to be a result of the transfer of tritium absorbed in the electrode membrane to the dilute hydrochloric acid solution side through the electrode membrane. In the present experimental system, it is considered that the hydrogen ions are supplied from the dilute hydrochloric acid solution tank side to the electrode membrane with respect to the hydrogen-containing manganese oxide electrode membrane installed in between the two tanks and the hydrogen ions are supplied to the electrode membrane surface on the tritium-containing water tank side according to the concentration gradient of hydrogen ion formed in the electrode membrane. For this reason, an operation to supplement the electrode with a hydrogen ion by repeating the acid treatment of the electrode, which is essential for the continuous adsorption treatment of tritium in Example 2, is not required, and thus it can be said that it is a more practical method. In the present method, the maximum tritium separation effect is obtained in about 1 hour by constantly monitoring the tritium concentration in water to be treated using a flow type scintillation counter. In addition, it can be expected to obtain a higher efficiency for the separation of tritium by increasing the exposed area of the electrode membrane.

The invention claimed is:

1. A method for separating tritium in water, the method comprising bringing tritium-containing water into contact with a tritium adsorbent to trap tritium from tritium-containing water, the tritium adsorbent comprising hydrogen- or lithium-containing manganese oxide having a spinel crystal structure.

2. The method for separating tritium in water according to claim 1, wherein the tritium adsorbent having tritium trapped is treated with an acid to elute tritium.

3. A method for regenerating a tritium adsorbent, the method comprising supplementing the tritium adsorbent which has been used for separating tritium by the method according to claim 1, with a hydrogen ion or a lithium ion to restore the adsorptivity to a tritium ion.

4. The method for regenerating a tritium adsorbent according to claim 3, wherein a hydrogen ion is supplemented through an acid treatment.

5. A method for separating tritium in water, the method comprising bringing tritium-containing water into contact with a tritium adsorbent to trap tritium from tritium-containing water, the tritium adsorbent comprising hydrogen- or lithium-containing manganese oxide having a spinal crystal structure which is a powder, a membrane construct, or an electrode to trap and separate tritium in the tritium-containing water.

6. A method for regenerating a tritium adsorbent, the method comprising supplementing the tritium adsorbent which has been used for separating tritium by the method according to claim 5, with a hydrogen ion or a lithium ion to restore the adsorptivity to a tritium ion.

* * * * *